US009880883B2

(12) United States Patent
Koizumi

(10) Patent No.: US 9,880,883 B2
(45) Date of Patent: Jan. 30, 2018

(54) VIRTUAL RESOURCE CONTROL SYSTEM DETERMINING NEW ALLOCATION OF RESOURCES AT A HUB

(71) Applicant: NEC Corporation, Tokyo (JP)

(72) Inventor: Seiichi Koizumi, Tokyo (JE)

(73) Assignee: NEC Corporation, Tokyo (JP)

( * ) Notice: Subject to any disclaimer, the term of this patent is extended or adjusted under 35 U.S.C. 154(b) by 170 days.

(21) Appl. No.: 14/909,866

(22) PCT Filed: Jun. 24, 2014

(86) PCT No.: PCT/JP2014/003383
§ 371 (c)(1),
(2) Date: Feb. 3, 2016

(87) PCT Pub. No.: WO2015/019538
PCT Pub. Date: Feb. 12, 2015

(65) Prior Publication Data
US 2016/0196168 A1    Jul. 7, 2016

(30) Foreign Application Priority Data
Aug. 5, 2013 (JP) ................................ 2013-162456

(51) Int. Cl.
*G06F 9/50* (2006.01)
(52) U.S. Cl.
CPC .......... *G06F 9/5077* (2013.01); *G06F 9/5061* (2013.01)
(58) Field of Classification Search
None
See application file for complete search history.

(56) References Cited

U.S. PATENT DOCUMENTS 8,725,886 B1 * 5/2014 Pulier .................. H04L 47/822
709/217
2009/0089699 A1 * 4/2009 Saha .................. H04L 43/0876
715/771
(Continued)

FOREIGN PATENT DOCUMENTS

JP    64-002145 A    1/1989
JP    2006-522961 A   10/2006
(Continued)

OTHER PUBLICATIONS

Japanese Decision to Grant a Patent issued by the Japan Patent Office for Japanese Application No. 2015-530673 dated Jul. 11, 2017 (5 pages).
(Continued)

*Primary Examiner* — Meng An
*Assistant Examiner* — Michael Ayers
(74) *Attorney, Agent, or Firm* — Wilmer Cutler Pickering Hale & Dorr

(57) ABSTRACT

To provide a virtual resource control system capable of appropriately defining the amounts of allocated virtual resources to individual service systems under an environment in which service systems are added or deleted. A resource excessive/lacking amount calculation means 54 simulates a resource consumption situation of each node in the service system by use of a hybrid model, and calculates the amount of excessive/lacking resource indicating the lacking amount or the excessive amount of the amount of allocated virtual resource corresponding to one entire service system corresponding to a service management device. The resource excessive/lacking amount calculation means 54 notifies the amount of excessive/lacking resource to a hub device 60, and receives a notification of the new amount of allocated virtual resource corresponding to the entire service system. A notification by the resource excessive/lacking
(Continued)

amount calculation means 54 and a response from the hub device 60 are made asynchronously.

6 Claims, 18 Drawing Sheets

(56) References Cited

U.S. PATENT DOCUMENTS

| | | | |
|---|---|---|---|
| 2009/0235268 A1* | 9/2009 | Seidman | G06F 11/3442 718/104 |
| 2012/0221454 A1 | 8/2012 | Morgan | |
| 2014/0282591 A1* | 9/2014 | Stich | G06F 9/5061 718/104 |
| 2014/0373010 A1* | 12/2014 | Folco | G06F 9/45533 718/1 |

FOREIGN PATENT DOCUMENTS

| | | |
|---|---|---|
| JP | 2010-033292 A | 2/2010 |
| JP | 2011-081579 A | 4/2011 |
| JP | 2012-168585 A | 9/2012 |

OTHER PUBLICATIONS

International Search Report corresponding to PCT/JP2014/003383 dated Aug. 19, 2014 (3 pages).

\* cited by examiner

FIG. 3

NODE_RESOURCE TABLE

| NODE ID | RESOURCE TYPE | AMOUNT OF ALLOCATED RESOURCE | AMOUNT OF CONSUMED RESOURCE | MINIMUM AMOUNT OF REMAINING RESOURCE | MAXIMUM AMOUNT OF LACKING RESOURCE | SERVICE ID |
|---|---|---|---|---|---|---|
| sv1_n1 | CPU | 2 | 0.5 | | | sv1 |
| sv1_n2 | CPU | 4 | 0.75 | | | sv1 |
| sv1_n1 | RAM | 1 | 0.2 | | | sv1 |
| sv1_n2 | RAM | 6 | 0.5 | | | sv1 |
| ... | ... | ... | ... | ... | ... | ... |

| NODE ID | NODE NAME | AVERAGE PROCESSING TIME |
|---|---|---|
| sv1_n1 | Web1 | 2sec |
| sv1_n2 | App1 | 3sec |
| ... | ... | ... |

FIG. 4

SERVICE_LOG TABLE

| LOG ID | SERVICE ID | TIME STAMP |
|---|---|---|
| log1 | sv1 | 2013-02-12_15:19:21.100 |
| log2 | sv1 | 2013-02-12_15:19:23.610 |
| ... | ... | ... |

FIG. 5

SERVICE_RESOURCE DISTRIBUTION TABLE

| SERVICE ID | AMOUNT OF RESOURCE | AMOUNT OF EXCESSIVE /LACKING RESOURCE | RESOURCE TYPE |
|---|---|---|---|
| sv1 | 15 | -2 | CPU |
| sv1 | 21 | 4 | RAM |

FIG. 6

SERVICE_MODEL TABLE

| SERVICE ID | SERVICE MODEL | HYBRID MODEL |
|---|---|---|
| sv1 | | |

FIG. 10

HUB_SERVICE_RESOURCE DISTRIBUTION TABLE

| SERVICE ID | HUB ID | AMOUNT OF RESOURCE | AMOUNT OF EXCESSIVE /LACKING RESOURCE | RESOURCE TYPE |
|---|---|---|---|---|
| sv1 | hub1 | 15 | -2 | CPU |
| sv1 | hub1 | 21 | 4 | RAM |
| sv2 | hub1 | 20 | 1 | CPU |
| sv2 | hub1 | 18 | -6 | RAM |
| ... | ... | ... | ... | ... |

FIG. 11

HUB_RESOURCE DISTRIBUTION TABLE

| HUB ID | HUB_RESOURCE AMOUNT | HUB_RESOURCE EXCESSIVE /LACKING AMOUNT | RESOURCE TYPE |
|---|---|---|---|
| hub1 | 70 | -5 | CPU |
| hub1 | 100 | 8 | RAM |

FIG. 12

POOL_HUB_RESOURCE DISTRIBUTION TABLE

| HUB ID | POOL ID | HUB_RESOURCE AMOUNT | HUB_RESOURCE EXCESSIVE /LACKING AMOUNT | RESOURCE TYPE |
|---|---|---|---|---|
| hub1 | pool1 | 70 | -5 | CPU |

FIG. 13

POOL_RESOURCE CAPACITY TABLE

| POOL ID | POOL_ALLOCATION CAPACITY | POOL_RESOURCE CAPACITY | RESOURCE TYPE | RESOURCE UNIT |
|---|---|---|---|---|
| pool1 | 70 | 300 | CPU | virtual_core |

FIG. 14

POOL_HUB_RESOURCE DISTRIBUTION TABLE

| HUB ID | POOL ID | HUB_RESOURCE AMOUNT | HUB_RESOURCE EXCESSIVE /LACKING AMOUNT | RESOURCE TYPE |
|---|---|---|---|---|
| hub1 | pool2 | 100 | 8 | RAM |

FIG. 15

POOL_RESOURCE CAPACITY TABLE

| POOL ID | POOL_ALLOCATION CAPACITY | POOL_RESOURCE CAPACITY | RESOURCE TYPE | RESOURCE UNIT |
|---|---|---|---|---|
| pool2 | 100 | 1000 | RAM | GB |

FIG. 19

NODE_RESOURCE TABLE

| NODE ID | RESOURCE TYPE | AMOUNT OF ALLOCATED RESOURCE | AMOUNT OF CONSUMED RESOURCE | MINIMUM AMOUNT OF REMAINING RESOURCE | MAXIMUM AMOUNT OF LACKING RESOURCE | SERVICE ID |
|---|---|---|---|---|---|---|
| sv1_n1 | CPU | 2 | 0.5 | 0 | -1 | sv1 |
| sv1_n2 | CPU | 4 | 0.75 | 1 | 0 | sv1 |
| sv1_n1 | RAM | 1 | 0.2 | 0 | -1 | sv1 |
| sv1_n2 | RAM | 6 | 0.5 | 4 | 0 | sv1 |
| ... | ... | ... | ... | ... | ... | ... |

| NODE ID | NODE NAME | AVERAGE PROCESSING TIME |
|---|---|---|
| sv1_n1 | Web1 | 2sec |
| sv1_n2 | App1 | 3sec |
| ... | ... | ... |

FIG. 20

NODE_RESOURCE TABLE

| NODE ID | RESOURCE TYPE | AMOUNT OF ALLOCATED RESOURCE | AMOUNT OF CONSUMED RESOURCE | MINIMUM AMOUNT OF REMAINING RESOURCE | MAXIMUM AMOUNT OF LACKING RESOURCE | SERVICE ID |
|---|---|---|---|---|---|---|
| sv1_n1 | CPU | 3 | 0.5 | | | sv1 |
| sv1_n2 | CPU | 3 | 0.75 | | | sv1 |
| sv1_n1 | RAM | 2 | 0.2 | | | sv1 |
| sv1_n2 | RAM | 2 | 0.5 | | | sv1 |
| ... | ... | ... | ... | ... | ... | ... |

| NODE ID | NODE NAME | AVERAGE PROCESSING TIME |
|---|---|---|
| sv1_n1 | Web1 | 2sec |
| sv1_n2 | App1 | 3sec |
| ... | ... | ... |

FIG. 21

HUB_RESOURCE DISTRIBUTION TABLE

| HUB ID | HUB_RESOURCE AMOUNT | HUB_RESOURCE EXCESSIVE /LACKING AMOUNT | RESOURCE TYPE |
|---|---|---|---|
| hub1 | 75 | | CPU |
| hub1 | 92 | | RAM |

FIG. 22

HUB_SERVICE_RESOURCE DISTRIBUTION TABLE

| SERVICE ID | HUB ID | AMOUNT OF RESOURCE | AMOUNT OF EXCESSIVE /LACKING RESOURCE | RESOURCE TYPE |
|---|---|---|---|---|
| sv1 | hub1 | 17 | | CPU |
| sv1 | hub1 | 17 | | RAM |
| sv2 | hub1 | 19 | | CPU |
| sv2 | hub1 | 24 | | RAM |
| ... | ... | ... | ... | ... |

FIG. 23

POOL_HUB_RESOURCE DISTRIBUTION TABLE

| HUB ID | POOL ID | HUB_RESOURCE AMOUNT | HUB_RESOURCE EXCESSIVE /LACKING AMOUNT | RESOURCE TYPE |
|---|---|---|---|---|
| hub1 | pool1 | 75 | | CPU |

FIG. 24

POOL_RESOURCE CAPACITY TABLE

| POOL ID | POOL_ALLOCATION CAPACITY | POOL_RESOURCE CAPACITY | RESOURCE TYPE | RESOURCE UNIT |
|---|---|---|---|---|
| pool1 | 75 | 300 | CPU | virtual_core |

FIG. 25

POOL_HUB_RESOURCE DISTRIBUTION TABLE

| HUB ID | POOL ID | HUB_RESOURCE AMOUNT | HUB_RESOURCE EXCESSIVE /LACKING AMOUNT | RESOURCE TYPE |
|---|---|---|---|---|
| hub1 | pool2 | 92 | | RAM |

FIG. 26

POOL_RESOURCE CAPACITY TABLE

| POOL ID | POOL_ALLOCATION CAPACITY | POOL_RESOURCE CAPACITY | RESOURCE TYPE | RESOURCE UNIT |
|---|---|---|---|---|
| pool2 | 92 | 1000 | RAM | GB |

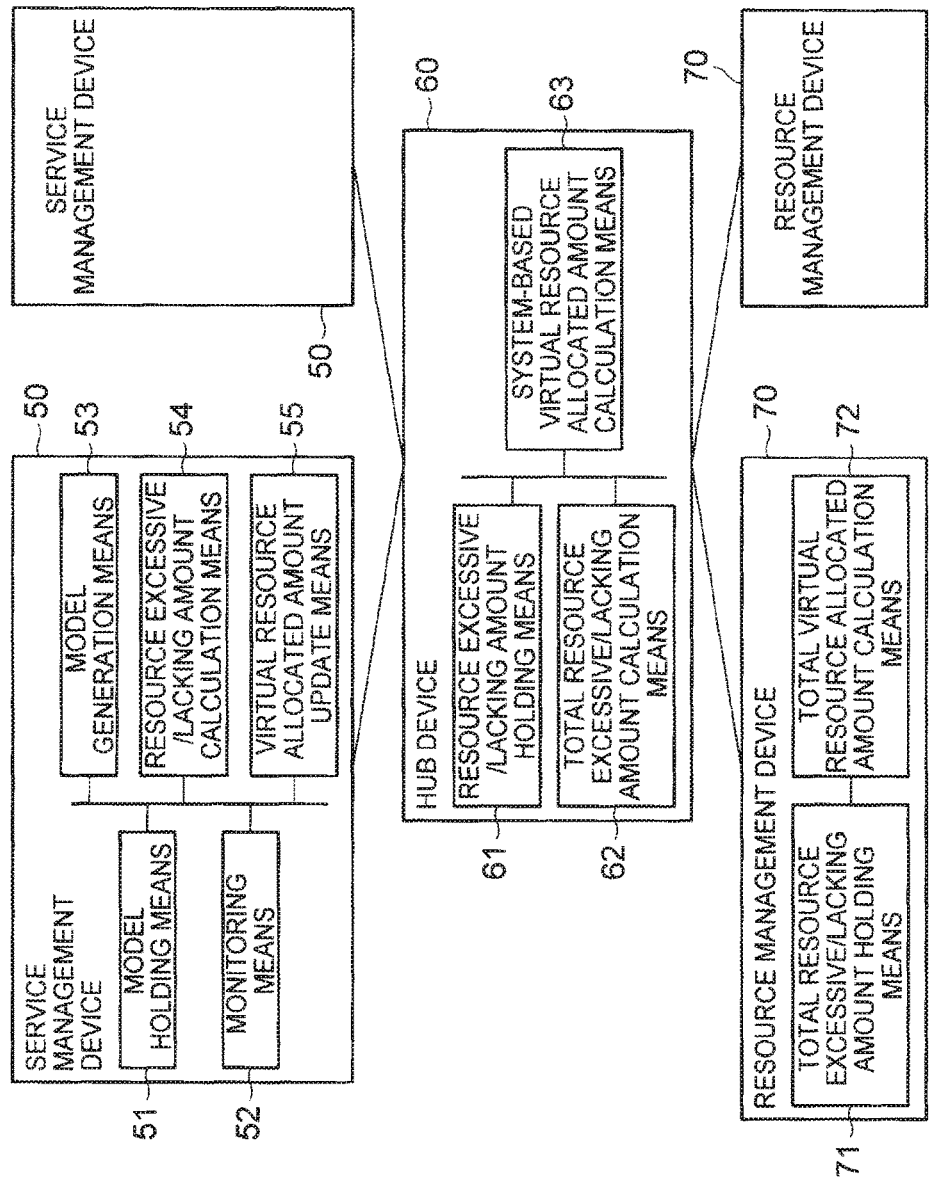

VIRTUAL RESOURCE CONTROL SYSTEM DETERMINING NEW ALLOCATION OF RESOURCES AT A HUB

CROSS-REFERENCE TO RELATED APPLICATIONS

This application is a national stage application of International Application No. PCT/JP2014/003383 entitled "Virtual Resource Control System and Virtual Resource Control Method" filed on Jun. 24, 2014, which claims priority to Japanese Application No. 2013-162456 filed on Aug. 5, 2013, the disclosures of which are hereby incorporated by reference in their entirety.

TECHNICAL FIELD

The present invention relates to a virtual resource control system for controlling the amounts of allocated virtual resources to a plurality of service systems, a virtual resource control method, a service management device, a hub device, a service management device program, and a hub device program applied to the virtual resource control system and the virtual resource control method.

BACKGROUND ART

A plurality of service systems for providing services to users are present on the Cloud platform such as IaaS (Infrastructure as a Service). Such service systems have various types such as EC (Electronic Commerce) system and animation distribution system. An individual service system includes a plurality of nodes such as Web server, application server and database server. Application server may be denoted as App server in the following. Database server may be denoted as DB server.

PTL 1 describes therein a virtual resource operation and management system. The operation and management system described in PTL 1 is to control a virtual system whose structure is defined in a template.

A virtual server resource adjustment system described in PTL 2 calculates the amount of empty resource as the amount of resource capable of being reduced based on the amount of currently-allocated resource and sums up the respective amounts of empty resources thereby to calculate the total amount of empty resources for the respective virtual servers. The virtual server resource adjustment system then calculates the amount of resource to be added based on a high load of a virtual server, and compares it with the total amount of empty resources. When the total amount of empty resources is larger, the virtual server resource adjustment system determines that the resource can be added. PTL 2 lists, as exemplary resources, CPU (Central Processing Unit), memory, disk I/O (Input/Output), and network I/O.

PTL 3 discloses therein a structure in which a client and servers are provided and data resources are divided into some servers. PTL 3 describes that loads on the servers are to be balanced.

CITATION LIST

Patent Literature

PTL 1: Japanese Patent Application Laid-Open No. 2011-81579 (Paragraph 0072, FIG. 18)
PTL 2: Japanese Patent Application Laid-Open No. 2010-33292 (Paragraphs 0016, 0028 to 0029, FIG. 5, FIG. 6)
PTL 3: Japanese Patent Application National Publication (Laid-Open) No. 2006-522961 (Paragraphs 0033, 0044, 0063 to 0073, 0082, 0083, FIG. 2, FIG. 4)

SUMMARY OF INVENTION

Technical Problem

Each service system present on the Cloud platform is different in its structure and behavior. Therefore, resources adapted to an operation situation of a service system need to be dynamically allocated, and a resource consumption state in the service system needs to be grasped to allocate appropriate resources in order to keep high service quality. Such fine virtual resource allocation control is easily applicable when a structure to be managed is static. However, under an environment in which service systems are frequently added or deleted as in the Cloud environment, such fine virtual resource allocation control is difficult.

The technique described in PTL 1 is to control a virtual system whose structure is defined in a template, and thus is not suitable to an environment in which service systems are frequently added or deleted.

Under an environment in which service systems are added or deleted, it is preferable that virtual resources are appropriately allocated to individual service systems.

It is therefore an object of the present invention to provide a virtual resource control system capable of appropriately defining the amount of allocated virtual resource to an individual service system under an environment in which service systems are added or deleted, a virtual resource control method, a service management device applied to the virtual resource control system and the virtual resource control method, a hub device, a service management device program, and a hub device program.

Solution to Problem

A virtual resource control system according to the present invention includes: service management devices corresponding to service systems for providing services on a one-to-one basis and directed for defining the amount of allocated virtual resource to an individual node in a corresponding service system; a hub device for receiving the amount of excessive/lacking resource indicating the lacking amount or the excessive amount of the amount of allocated virtual resource to one entire service system corresponding to a service management device, and notifying the amount of allocated virtual resource to one entire service system corresponding to the service management device to the service management device; and resource management devices for calculating the amount of allocated virtual resource to each entire service system, wherein each service management device includes: a model holding means for holding a service model expressing input and output of each node in a service system corresponding to the device in order of processings; a monitoring means for measuring the amount of allocated virtual resource, the amount of unit consumed resource as the amount of virtual resource consumed for one request, and an average processing time for each node in the service system, and acquiring a log indicating a request made in the service system; a model generation means for generating a resource model expressing the amount of unused resource and the amount of using resource of a node on input into the node based on the amount of allocated virtual resource, the amount of unit consumed resource, and an average processing time of each node as well as the service model, and generating a hybrid model in a combination of the service model and the resource model; a resource excessive/lacking amount calculation means for simulating a resource consumption situation of each node in the service system by use of the hybrid model and the log, calculating the minimum amount of remaining resource as a minimum value of the amount of remaining virtual resource and the maximum amount of lacking resource as a maximum value of the amount of lacking virtual resource per node, calculating the amount of excessive/lacking resource based on the minimum amount of remaining resource and the maximum amount of lacking resource per node, notifying the amount of excessive/lacking resource to the hub device, and receiving a notification of the amount of allocated virtual resource to one entire service system corresponding to the service management device in which the lacking amount or the excessive amount indicated by the amount of excessive/lacking resource is eliminated from the hub device; and a virtual resource allocated amount update means for updating the amount of allocated virtual resource in order to eliminate the minimum amount of remaining resource or the maximum amount of lacking resource per node, the hub device includes: a resource excessive/lacking amount holding means for holding the amount of excessive/lacking resource notified from each service management device; a total resource excessive/lacking amount calculation means for calculating the total amount of excessive/lacking resource indicating the lacking amount or the excessive amount of the amount of allocated virtual resource to each entire service system based on the amount of excessive/lacking resource notified from each service management device every certain period of time, notifying the total amount of excessive/lacking resource to a resource management device, and receiving a notification of the amount of allocated virtual resource to each entire service system in which the total amount of excessive/lacking resource is eliminated from the resource management device; and a system-based virtual resource allocated amount calculation means for calculating the amount of allocated virtual resource to one entire service system corresponding to a service management device in which the lacking amount or the excessive amount indicated by the amount of excessive/lacking resource is eliminated, and notifying the allocated amount to the service management device which has transmitted the amount of excessive/lacking resource, and the resource management device includes: a total resource excessive/lacking amount holding means for holding the total amount of excessive/lacking resource notified from the hub device; and a total virtual resource allocated amount calculation means for confirming the total amount of excessive/lacking resource every certain period of time, calculating the amount of allocated virtual resource to each entire service system in which the total amount of excessive/lacking resource is eliminated, and notifying the allocated amount to the hub device.

In addition, a virtual resource control method according to the present invention is a virtual resource control method using service management devices corresponding to service systems for providing services on a one-to-one basis and directed for defining the amount of allocated virtual resource to an individual node in a corresponding service system, a hub device for receiving the amount of excessive/lacking resource indicating the lacking amount or the excessive amount of the amount of allocated virtual resource to one entire service system corresponding to a service management device, and notifying the amount of allocated virtual resource to one entire service system corresponding to the service management device to the service management device, and resource management devices for calculating the amount of allocated virtual resource to each entire service system, wherein each service management device: holds a service model expressing input and output of each node in a service system corresponding to the device in order of processings, measures the amount of allocated virtual resource, the amount of unit consumed resource as the amount of virtual resource consumed for one request, and an average processing time for each node in the service system, and acquires a log indicating a request made in the service system, generates a resource model expressing the amount of unused resource and the amount of using resource of a node on input into the node based on the amount of allocated virtual resource, the amount of unit consumed resource, and an average processing time of each node as well as the service model, and generates a hybrid model in a combination of the service model and the resource model, and simulates a resource consumption situation of each node in the service system by use of the hybrid model and the log, calculates the minimum amount of remaining resource as a minimum value of the amount of remaining virtual resource and the maximum amount of lacking resource as a maximum value of the amount of lacking virtual resource per node, calculates the amount of excessive/lacking resource based on the minimum amount of remaining resource and the maximum amount of lacking resource per node, and notifies the amount of excessive/lacking resource to the hub device, the hub device: holds the amount of excessive/lacking resource notified from each service management device, calculates the total amount of excessive/lacking resource indicating the lacking amount or the excessive amount of the amount of allocated virtual resource to each entire service system based on the amount of excessive/lacking resource notified from each service management device every certain period of time, and notifies the total amount of excessive/lacking resource to a resource management device, the resource management device: holds the total amount of excessive/lacking resource notified from the hub device, and confirms the total amount of excessive/lacking resource every certain period of time, calculates the amount of allocated virtual resource to each entire service system in which the total amount of excessive/lacking resource is eliminated, and notifies the allocated amount to the hub device, the hub device: receives a notification of the amount of allocated virtual resource to each entire service system from the resource management device, calculates the amount of allocated virtual resource to one entire service system corresponding to a service management device in which the lacking amount or the excessive amount indicated by the amount of excessive/lacking resource is eliminated, and notifies the allocated amount to the service management device which has transmitted the amount of excessive/lacking resource, and each service management device receives a notification of the amount of allocated virtual resource to one entire service system corresponding to the device, and updates the amount of allocated virtual resource in order to eliminate the minimum amount of remaining resource or the maximum amount of lacking resource per node.

In addition, a service management device according to the present invention is a service management device corresponding to a service system for providing a service on a one-to-one basis and directed for defining the amount of allocated virtual resource to an individual node in a corresponding service system, the service management device including: a model holding means for holding a service model expressing input and output of each node in a service system corresponding to the service management device in order of processings; a monitoring means for measuring the amount of allocated virtual resource, the amount of unit consumed resource as the amount of virtual resource consumed for one request, and an average processing time for each node in the service system, and acquiring a log indicating a request made in the service system; a model generation means for generating a resource model expressing the amount of unused resource and the amount of using resource of a node on input into the node based on the amount of allocated virtual resource, the amount of unit consumed resource, and an average processing time of each node as well as the service model, and generating a hybrid model in a combination of the service model and the resource model; a resource excessive/lacking amount calculation means for simulating a resource consumption situation of each node in the service system by use of the hybrid model and the log, calculating the minimum amount of remaining resource as a minimum value of the amount of remaining virtual resource and the maximum amount of lacking resource as a maximum value of the amount of lacking virtual resource per node, calculating the amount of excessive/lacking resource indicating the lacking amount or the excessive amount of the amount of allocated virtual resource to one entire service system corresponding to the service management system based on the minimum amount of remaining resource and the maximum amount of lacking resource per node, notifying the amount of excessive/lacking resource to the hub device for defining the amount of allocated virtual resource to one entire service system corresponding to the service management device, and receiving a notification of the amount of allocated virtual resource to one entire service system corresponding to the service management device in which the lacking amount or the excessive amount indicated by the amount of excessive/lacking resource is eliminated from the hub device; and a virtual resource allocated amount update means for updating the amount of allocated virtual resource in order to eliminate the minimum amount of remaining resource or the maximum amount of lacking resource per node.

In addition, a hub device according to the present invention is a hub device used together with service management devices corresponding to service systems for providing services on a one-to-one basis and directed for defining the amount of allocated virtual resource to an individual node in a corresponding service system, and resource management devices for calculating the amount of allocated virtual resource to each entire service system, and directed for receiving the amount of excessive/lacking resource indicating the lacking amount or the excessive amount of the amount of allocated virtual resource to one entire service system corresponding to a service management device, and notifying the amount of allocated virtual resource to one entire service system corresponding to the service management device to the service management device, the hub device including: a resource excessive/lacking amount holding means for holding the amount of excessive/lacking resource notified from each service management device; a total resource excessive/lacking amount calculation means for calculating the total amount of excessive/lacking resource indicating the lacking amount or the excessive amount of the amount of allocated virtual resource to each entire service system based on the amount of excessive/lacking resource notified from each service management device every certain period of time, notifying the total amount of excessive/lacking resource to a resource management device, and receiving a notification of the amount of allocated virtual resource to each entire service system in which the total amount of excessive/lacking resource is eliminated from the resource management device; and a system-based virtual resource allocated amount calculation means for calculating the amount of allocated virtual resource to one entire service system corresponding to a service management device in which the lacking amount or the excessive amount indicated by the amount of excessive/lacking resource is eliminated, and notifying the allocated amount to the service management device which has transmitted the amount of excessive/lacking resource.

In addition, a service management device program according to the present invention is a service management device program mounted on a computer corresponding to a service system for providing a service on a one-to-one basis and directed for defining the amount of allocated virtual resource to an individual node in a corresponding service system, the program for causing the computer to perform: a model holding processing of holding a service model expressing input and output of each node in a service system corresponding to the computer in order of processings; a monitoring processing of measuring the amount of allocated virtual resource, the amount of unit consumed resource as the amount of virtual resource consumed for one request, and an average processing time for each node in the service system, and acquiring a log indicating a request made in the service system; a model generation processing of generating a resource model expressing the amount of unused resource and the amount of using resource of a node on input into the node based on the amount of allocated virtual resource, the amount of unit consumed resource, and an average processing time of each node as well as the service model, and generating a hybrid model in a combination of the service model and the resource model; a resource excessive/lacking amount calculation processing of simulating a resource consumption situation of each node in the service system by use of the hybrid model and the log, calculating the minimum amount of remaining resource as a minimum value of the amount of remaining virtual resource and the maximum amount of lacking resource as a maximum value of the amount of lacking virtual resource per node, calculating the amount of excessive/lacking resource indicating the lacking amount or the excessive amount of the amount of allocated virtual resource to one entire service system corresponding to the computer based on the minimum amount of remaining resource and the maximum amount of lacking resource per node, notifying the amount of excessive/lacking resource to the hub device for defining the amount of allocated virtual resource to one entire service system corresponding to the computer, and receiving a notification of the amount of allocated virtual resource to one entire service system corresponding to the computer in which the lacking amount or the excessive amount indicated by the amount of excessive/lacking resource is eliminated from the hub device; and a virtual resource allocated amount update processing of updating the amount of allocated virtual resource in order to eliminate the minimum amount of remaining resource or the maximum amount of lacking resource per node.

In addition, a hub device program according to the present invention is a hub device program mounted on a computer used together with service management devices corresponding to service systems for providing services on a one-to-one basis and directed for defining the amount of allocated virtual resource to an individual node in a corresponding service system, and resource management devices for calculating the amount of allocated virtual resource to each entire service system, and directed for receiving the amount of excessive/lacking resource indicating the lacking amount or the excessive amount of the amount of allocated virtual resource to one entire service system corresponding to a service management device, and notifying the amount of allocated virtual resource to one entire service system corresponding to the service management device to the service management device, the program for causing the computer to perform: a resource excessive/lacking amount holding processing of holding the amount of excessive/lacking resource notified from each service management device; a total resource excessive/lacking amount calculation processing of calculating the total amount of excessive/lacking resource indicating the lacking amount or the excessive amount of the amount of allocated virtual resource to each entire service system based on the amount of excessive/lacking resource notified from each service management device every certain period of time, notifying the total amount of excessive/lacking resource to a resource management device, and receiving a notification of the amount of allocated virtual resource to each entire service system in which the total amount of excessive/lacking resource is eliminated from the resource management device; and a system-based virtual resource allocated amount calculation processing of calculating the amount of allocated virtual resource to one entire service system corresponding to a service management device in which the lacking amount or the excessive amount indicated by the amount of excessive/lacking resource is eliminated, and notifying the allocated amount to the service management device which has transmitted the amount of excessive/lacking resource.

Advantageous Effects of Invention

According to the present invention, it is possible to appropriately define the amount of allocated virtual resource to an individual service system under an environment in which service systems are added or deleted.

BRIEF DESCRIPTION OF DRAWINGS

FIG. 3 It depicts an explanatory diagram illustrating an exemplary node_resource table.

FIG. 4 It depicts an explanatory diagram illustrating an exemplary service_log table.

FIG. 5 It depicts an explanatory diagram illustrating an exemplary service_resource distribution table.

FIG. 6 It depicts an explanatory diagram illustrating an exemplary service_model table.

FIG. 10 It depicts an explanatory diagram illustrating an exemplary hub_service_resource distribution table.

FIG. 11 It depicts an explanatory diagram illustrating an exemplary hub_resource distribution table.

FIG. 12 It depicts an explanatory diagram illustrating an exemplary pool_hub_resource distribution table.

FIG. 13 It depicts an explanatory diagram illustrating an exemplary pool_resource_capacity table.

FIG. 14 It depicts an explanatory diagram illustrating an exemplary pool_hub_resource distribution table.

FIG. 15 It depicts an explanatory diagram illustrating an exemplary pool_resource capacity table.

FIG. 19 It depicts an explanatory diagram illustrating an exemplary state in which the maximum amount of lacking resource and the minimum amount of remaining resource of each node are added to the node_resource table illustrated in FIG. 3.

FIG. 20 It depicts an explanatory diagram illustrating a state in which the node_resource table illustrated in FIG. 19 is updated.

FIG. 21 It depicts an explanatory diagram illustrating a state in which the hub_resource distribution table illustrated in FIG. 11 is updated.

FIG. 22 It depicts an explanatory diagram illustrating a state in which the hub_service_resource distribution table illustrated in FIG. 10 is updated.

FIG. 23 It depicts an explanatory diagram illustrating a state in which the pool_hub_resource distribution table illustrated in FIG. 12 is updated.

FIG. 24 It depicts an explanatory diagram illustrating a state in which the pool_resource capacity table illustrated in FIG. 13 is updated.

FIG. 25 It depicts an explanatory diagram illustrating a state in which the pool_hub_resource distribution table illustrated in FIG. 14 is updated.

FIG. 26 It depicts an explanatory diagram illustrating a state in which the pool_resource capacity table illustrated in FIG. 15 is updated.

FIG. 27 It depicts a block diagram illustrating main components according to the present invention.

DESCRIPTION OF EMBODIMENTS

An exemplary embodiment of the present invention will be described below with reference to the drawings.

Figure 1:
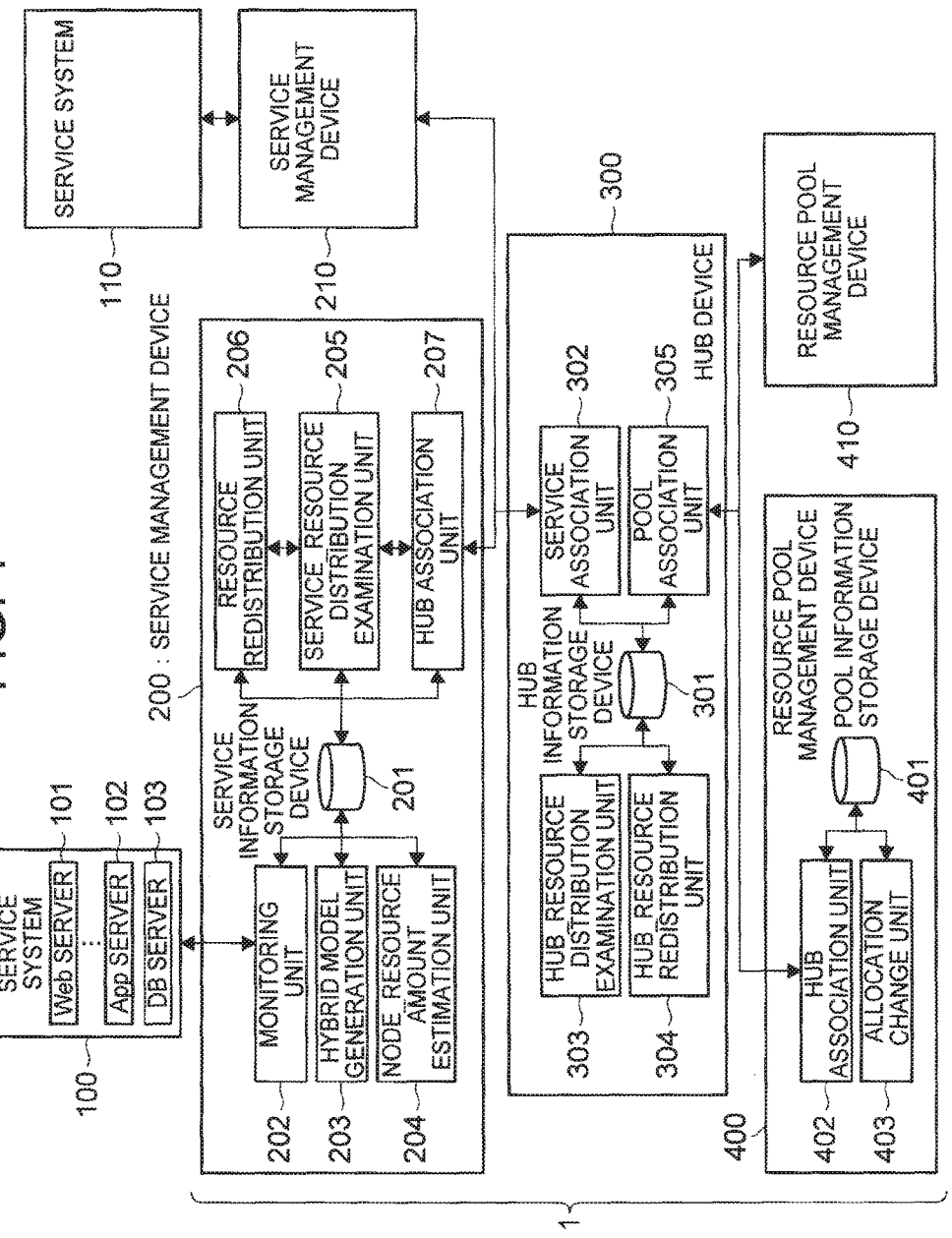
FIG. 1 It depicts a block diagram illustrating an exemplary structure of a virtual resource control system according to the present invention.

FIG. 1 is a block diagram illustrating an exemplary structure of a virtual resource control system according to the present invention. The virtual resource control system 1 according to the present invention includes service management devices 200, 210, a hub device 300, and resource pool management device 400, 410. The virtual resource control system 1 defines the amount of allocated virtual resource (such as virtual CPU or virtual RAM) to the service system 100, 110 depending on an operation situation of the service system 100, 110.

Figure 2:
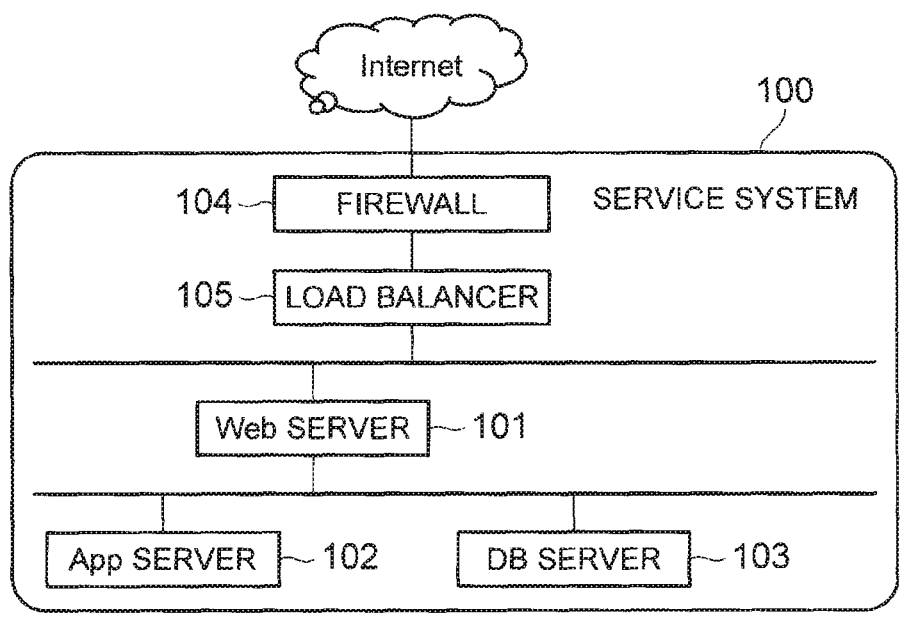
FIG. 2 It depicts a schematic diagram illustrating an exemplary service system.

The service system 100, 110 is to be allocated with a virtual resource. The individual service system 100, 110 performs a service provision processing on a user. A service type is different per service system. The service system 100 includes a Web server 101, an App server 102, and a DB server 103, for example. The service system 110 also includes the same group of servers, but a specific structure may be different per service system. Devices other than the Web server 101, the App server 102 and the DB server 103 may be provided in the service system. For example, the service system 100 may include a firewall 104 and a load balancer 105 as illustrated in FIG. 2.

The description will be made below assuming two service systems, but the number of service systems is not particularly limited.

The service management devices 200 and 210 are provided to correspond to the service systems 100 and 110 on a one-to-one basis. Thus, the service management devices are as many as the service systems. Each service management device 200, 210 measures the amount of unit consumed resource of each node in its corresponding service system (the amount of resource consumed for one request) or an average processing time of each node, and calculates the amount of excessing/lacking virtual resource in each node. Each service management device 200, 210 then changes the amount of allocated virtual resource of each node in its corresponding service system. Each service management device 200, 210 requests the hub device 300 to change the amounts of virtual resources to be allocated to the total nodes in its corresponding service system depending on the excessing amount or the lacking amount when a virtual resource is excessive or lacking in each entire node in its corresponding service system.

The service management devices correspond to the service systems on a one-to-one basis, and thus one service management device corresponds to one service.

The description will be made by way of the service management device 200, but the service management devices 200 and 210 have the same structure.

The service management device 200 includes a service information storage device 201, a monitoring unit 202, a hybrid model generation unit 203, a node_resource amount estimation unit 204, a service_resource distribution examination unit 205, a resource redistribution unit 206, and a hub association unit 207.

The service information storage device 201 stores therein a node_resource table, a service_log table, a service_resource distribution table, and a service_model table.

FIG. 3 is an explanatory diagram illustrating an exemplary node_resource table. The node_resource table stores therein node ID, resource type, amount of allocated resource, amount of consumed resource (amount of unit consumed resource), minimum amount of remaining resource, maximum amount of lacking resource, and service ID in an associated manner per combination of node in the service system 100 corresponding to the service management device 200 and type of a virtual resource allocated to the node. Resource type is a type of a virtual resource. The amount of allocated resource is the amount of resource currently allocated to a node. The minimum amount of remaining resource is a minimum value of the amount of remaining virtual resource when resource consumption in the node is simulated based on a log generated by the service system 100. The maximum amount of lacking resource is a maximum value of the amount of lacking virtual resource in the simulation. The maximum amount of lacking resource is found as a product of the maximum number of standby requests generated in the simulation and the amount of unit consumed resource. The minimum amount of remaining resource and the maximum amount of lacking resource are temporarily stored. Service ID is the ID of a service provided by the service system 100 corresponding to the service management device 200. Therefore, the service ID is common in the node_resource table of the service management device 200.

According to the present exemplary embodiment, the excessive amount for excess is denoted in a positive value and the lacking amount for lack is denoted in a negative value.

The node_resource table stores therein node ID, node name, and average processing time of the node per node in the service system 100 (see the lower part of FIG. 3).

FIG. 4 is an explanatory diagram illustrating an exemplary service_log table. The service system 100 generates one log each time one request is made. The log information is stored in the service_log table. Specifically, log ID, service ID, and time stamp are associated with each other to be stored. One row of data illustrated in FIG. 4 indicates one request made in the service system 100.

FIG. 5 is an explanatory diagram illustrating an exemplary service_resource distribution table. The service_resource distribution table stores therein the amount of resource currently allocated to an entire nodes in the service system 100 corresponding to the service management device 200, and the amount of excessive/lacking resource in the entire node per type of a virtual resource (resource type). Service ID is also stored per type of a virtual resource. The service ID in each row is common also in the service_resource distribution table similarly as in the node_resource table. When the amount of allocated resource in the node_resource table (see FIG. 3) is updated for eliminating an excessive/lacking virtual resource, the service_resource distribution examination unit 205 erases the amount of excessive/lacking resource corresponding to the amount of allocated resource.

FIG. 6 is an explanatory diagram illustrating an exemplary service_model table. The service_model table stores therein service ID, service_model, and hybrid model in an associated manner. The service_model and the hybrid model are not illustrated in FIG. 6. The service model is previously defined according to the service system 100 corresponding to the service management device 200, and is stored in the service_ model table. On the other hand, the hybrid model is generated based on service_model, the amount of resource allocated to each node, the measured amount of unit consumed resource, and an average processing time, and is stored in the service_model table.

Figure 7:
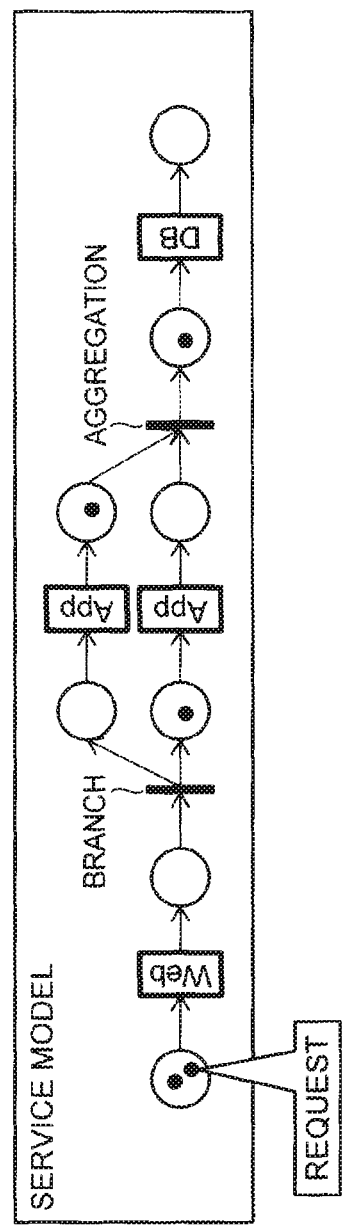
FIG. 7 It depicts an explanatory diagram schematically illustrating an exemplary service_model.

The service model is a data structure expressing input and output of each node in the service system in order of processings. FIG. 7 is an explanatory diagram schematically illustrating an exemplary service_model. In FIG. 7, the rectangles with the characters "Web," "App," and "DB" indicate a node (server). A circle on the left of a rectangle (node) indicates input into the node, and a circle on the right of a rectangle (node) indicates output from the node. A black point in a circle indicates a request. As illustrated in FIG. 7, a service model may express branch or aggregation of output of nodes. Branch or aggregation of output of nodes is expressed thereby to express the processings performed in parallel at the same time.

Figure 8:
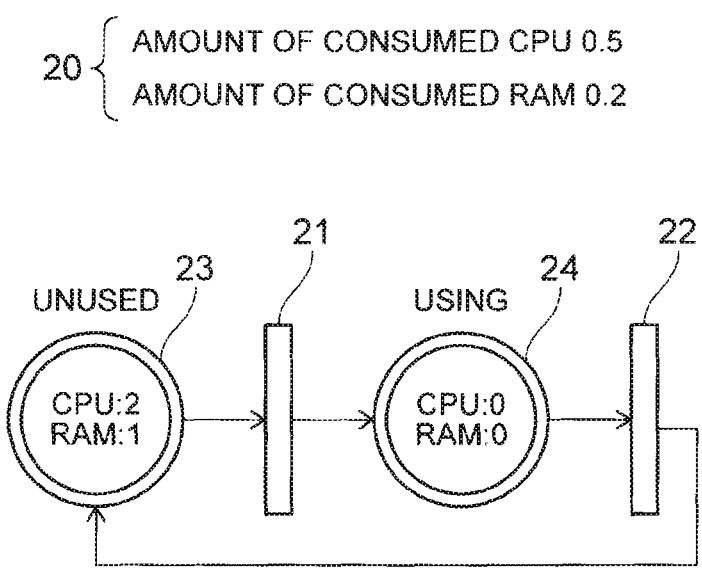
FIG. 8 It depicts an explanatory diagram schematically illustrating an exemplary resource model.

The hybrid model is a data structure in a combination of a service model and a resource model. A resource model will be first described. The resource model is a data structure expressing the amount of unused resource and the amount of using resource of a virtual resource in a node on input into the node. FIG. 8 is an explanatory diagram schematically illustrating an exemplary resource model. The resource model corresponds to a combination of input and output of a node in a service model. In FIG. 8, input into a node in the service model is indicated in rectangle 21, and output from the node is indicated in rectangle 22. A circle 23 on the left of the rectangle 21 indicates the amount of unused resource in the amount of resource allocated to the node. A circle 24 on the right of the rectangle 21 indicates the amount of using resource in the amount of resource allocated to the node. The resource model includes the amount of unit consumed resource 20 in the node. The circle 23 indicates the total amount of resource allocated to a node in the initial state of the resource model. The amount of unused resource indicated in the circle 23 and the amount of using resource indicated in the circle 24 are updated in response to a request when resource consumption of the node is simulated. In the simulation, after a request is made, the amount of unused resource indicated in the circle 23 and the amount of using resource indicated in the circle 24 are updated such that the amount of resource used in response to the request is returned to the unused state when an average processing time of the node elapses.

Figure 9:
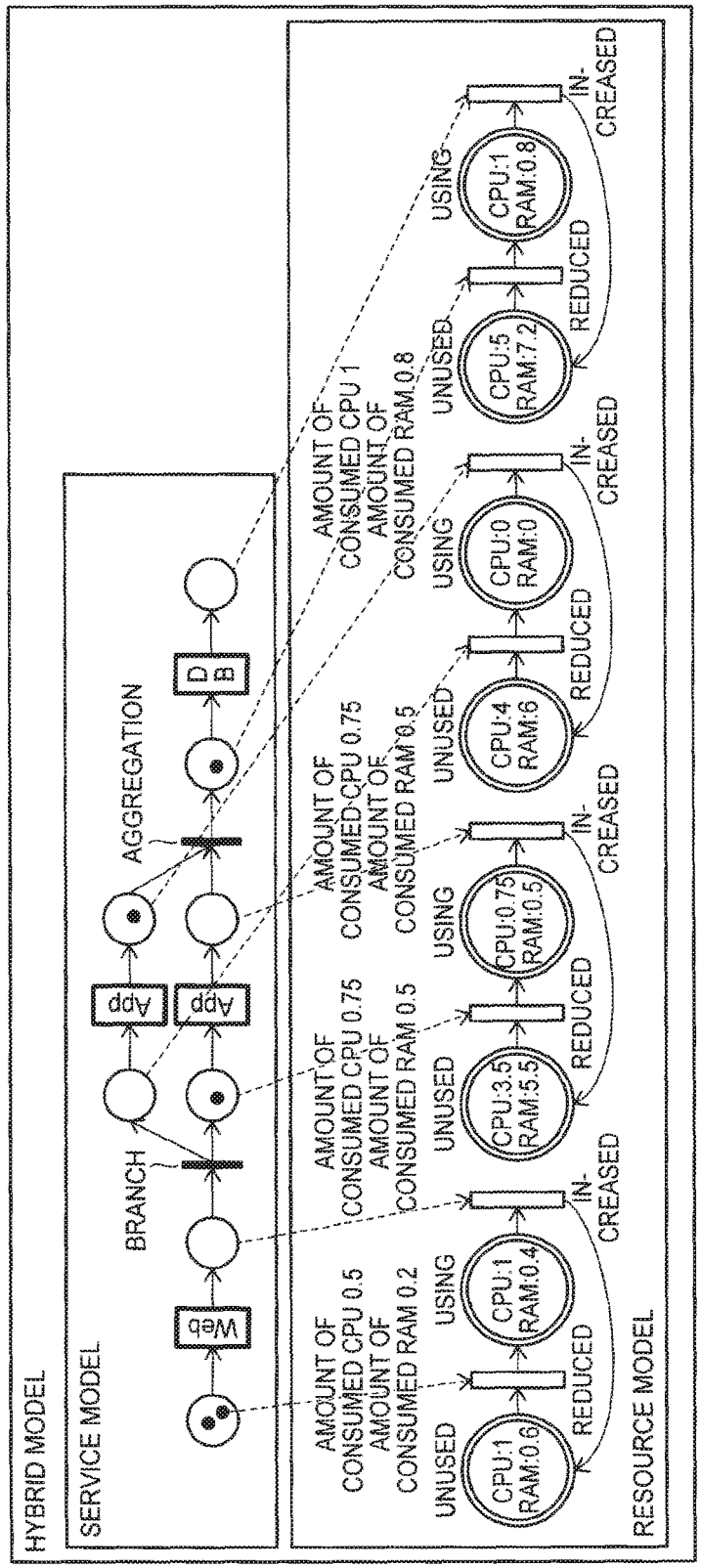
FIG. 9 It depicts an explanatory diagram illustrating an exemplary hybrid model.

FIG. 9 is an explanatory diagram illustrating an exemplary hybrid model. In the present example, each resource model corresponding to a combination of input and output of a node in the service model illustrated in FIG. 7 is generated and is combined with the service model. The amount of unused resource and the amount of using resource in the resource model illustrated in FIG. 9 indicate the values at a point of time during the simulation. Resource consumption of a node is simulated by use of the hybrid model so that the amount of unused resource or the amount of using resource can be reproduced per node such as Web server, App server or DB server thereby to find the amount of excessive/lacking virtual resource.

The above service model and hybrid model are stored in the service_model table (see FIG. 6).

For example, the service model is described in TimePetriNet and the resource model is described in Continuous PetriNet. The hybrid model is described in HybridPetriNet integrating them therein.

The monitoring unit 202 measures the amount of resource allocated to each node in the service system 100 corresponding to the service management device 200 and the amount of unit consumed resource of each node, and stores them in the node_resource table (see FIG. 3). The monitoring unit 202 measures an average processing time of each node and stores it in the node_resource table. Further, the monitoring unit 202 performs the processings per type of a virtual resource. The monitoring unit 202 acquires a log generated per individual request by the service system 100, and stores it in the service_log table.

The hybrid model generation unit 203 generates a resource model corresponding to a combination of input and output of a node based on the amount of allocated resource, the amount of consumed resource, an average processing time in the node_resource table (see FIG. 3), and the service model previously stored in the service_model table (see FIG. 7). The hybrid model generation unit 203 then generates a hybrid model in a combination of each resource model and the service model, and stores it in the service_model table.

The node_resource amount estimation unit 204 includes a hybrid model simulator, and simulates resource consumption of a node by use of the log acquired by the monitoring unit 202 from the service system 100, and the hybrid model. The node_resource amount estimation unit 204 then estimates a resource consumption situation at each node. Specifically, the node_resource amount estimation unit 204 finds the minimum amount of remaining resource and the maximum amount of lacking resource of each virtual resource at each node.

The service_resource distribution examination unit 205 calculates a difference between the absolute value of the sum of the minimum amounts of remaining resources of each node and the absolute value of the sum of the maximum amounts of lacking resources of each node. The difference corresponds to the amount of excessive/lacking virtual resource of a service corresponding to the service management device 200 (service provided by the service system 100). A positive value obtained by subtracting the absolute value of the sum of the maximum amounts of lacking resources from the absolute value of the sum of the minimum amounts of remaining resources corresponds to the excessive amount, and a negative value corresponds to the lacking amount. The service_resource distribution examination unit 205 makes the calculation per type of a virtual resource. The difference is stored as the amount of excessive/lacking resource indicated in FIG. 5 in the service_resource distribution table.

When the calculated difference indicates the amount of excessive virtual resource, the service_resource distribution examination unit 205 determines to return the amount of excessive virtual resource to the resource pool, and requests the hub device 300 to return the amount of excessive virtual resource via the hub association unit 207. When the calculated difference indicates the amount of lacking virtual resource, the service_resource distribution examination unit 205 determines to add the amount of lacking virtual resource from the resource pool, and requests the hub device 300 to permit to add the amount of lacking virtual resource via the hub association unit 207. When the hub device 300 responds to the request, the service_resource distribution examination unit 205 accordingly confirms to return or add the virtual resource.

The resource redistribution unit 206 determines to recover the virtual resource having the minimum amount of remaining resource from a node with a positive value of the minimum amount of remaining resource. The resource redistribution unit 206 determines to add the virtual resource having the maximum amount of lacking resource to a node lacking in the virtual resource. The amount of allocated virtual resource permitted to be newly added or the amount of resource to be recovered from a node having an excessive virtual resource is distributed and added to a node lacking in the virtual resource.

The hub association unit 207 requests the hub device 300 to permit to return an excessive virtual resource and to add a lacking virtual resource according to the service_resource distribution examination unit 205.

The monitoring unit 202, the hybrid model generation unit 203, the node_resource amount estimation unit 204, the service_resource distribution examination unit 205, the resource redistribution unit 206, and the hub association unit 207 are realized by the CPU in a computer operating according to a service management device program, for example. For example, the CPU may read the service management device program thereby to operate as the monitoring unit 202, the hybrid model generation unit 203, the node_resource amount estimation unit 204, the service_resource distribution examination unit 205, the resource redistribution unit 206, and the hub association unit 207 according to the program. The service management device program may be stored in a computer readable recording medium. Further, each component may be realized in different hardware.

The hub device 300 receives a request from each service management device 200, 210, and notifies, to the service management device, the amount of allocated virtual resource permitted to be allocated to the service system corresponding to the service management device per service management device with reference to each request every certain period of time. Therefore, when receiving a request to change the amount of allocated virtual resource from an individual service management device, the hub device 300 does not immediately respond to the request source service management device. That is, a request from each service management device 200, 210 and a notification of the allocated amount from the hub device 300 to each service management device 200, 210 are made asynchronously.

When a virtual resource in each entire service system 100, 110 corresponding to each service management device 200, 210 is excessive or lacking, the hub device 300 requests the resource pool management device to change the amount of allocated virtual resource to each entire service system 100, 110 depending on the excessive amount or the lacking amount.

A normal hub device and a standby hub device are provided for the hub device 300. In this case, the hub device IDs (which will be denoted as hub ID below) are defined for the normal hub device and the standby hub device, respectively. Usually, the normal hub device operates, and when an abnormality is caused in the normal hub device, the standby hub device operates in place of the normal hub device. The normal hub device and the standby hub device have the common structure. Only the normal hub device 300 is illustrated in FIG. 1.

There may be configured such that the hub device 300 is not made redundant but only one hub device 300 is provided. In this case, a hub ID may not be defined for the hub device 300.

The hub device 300 includes a hub information storage device 301, a service association unit 302, a hub_resource distribution examination unit 303, a hub_resource redistribution unit 304, and a pool association unit 305.

The hub information storage device 301 stores a hub_service_resource distribution table and a hub_resource distribution table therein.

FIG. 10 is an explanatory diagram illustrating an exemplary hub_service_resource distribution table. The hub_service_resource distribution table stores therein service ID, hub ID, amount of resource, amount of excessive/lacking resource, and resource type in an associated manner per combination of service ID and resource type. As described above, the service management devices correspond to the service systems on a one-to-one basis, and the service systems perform a different service provision processing. Therefore, a service ID can be used as information for identifying a service management device. A hub ID is the ID of the hub device 300 itself. When there is configured such that the hub device 300 is not made redundant but only one hub device 300 is provided, the hub ID may not be stored. The amount of resource is the amount of allocated virtual resource allocated to the entire service system corresponding to the service ID. For example, the first row in FIG. 10 indicates that the amount of resource of a virtual CPU is defined as "15" as the allocated amount to be allocated to the entire service system 100 in the service management device 200 corresponding to the service ID "sv1" and the amount of excessive/lacking resource of "−2" (or, two virtual CPU-core is lacking) is notified from the service management device 200. When the "amount of resource" is updated in the hub_service_resource distribution table, the "amount of excessive/lacking resource" corresponding to the "amount of resource" is erased.

FIG. 11 is an explanatory diagram illustrating an exemplary hub_resource distribution table. The hub_resource distribution table stores therein hub ID, amount of allocated virtual resource currently allocated to all the service systems 100 and 110 corresponding to all the service management devices 200 and 210 (hub_resource amount indicated in FIG. 11), amount of excessive/lacking resource in all the service systems 100 and 110 (hub_resource excessive/lacking amount indicated in FIG. 11), and resource type per type of a virtual resource (resource type). When the "hub_resource amount" is updated, the "hub_resource excessive/lacking amount" corresponding to the "hub_resource amount" is erased.

The service association unit 302 receives a request to return the amount of excessive virtual resource or to add the amount of lacking virtual resource from the hub association unit 207, and stores the excessive amount or the lacking amount as the "amount of excessive/lacking resource" in the hub_service_resource distribution table (see FIG. 10). When the amount of allocated virtual resource permitted to be allocated to a service system corresponding to a service management device is changed, the service association unit 302 notifies the changed allocated amount to the service management device.

The hub_resource distribution examination unit 303 reads the amount of excessive/lacking resource per service system from the hub_service_resource distribution table (see FIG. 10) every certain period of time. The hub_resource distribution examination unit 303 then calculates the sum of the amounts of excessive/lacking resource per resource type, and stores the calculation result as the hub_resource excessive/lacking amount in the hub_resource distribution table (see FIG. 11). A positive value of the hub_resource excessive/lacking amount (the sum of the amounts of excessive/lacking resource per resource type) indicates the amount of excessive virtual resource. A negative value of the hub_resource excessive/lacking amount indicates the amount of lacking virtual resource.

When the hub_resource excessive/lacking amount indicates the amount of excessive virtual resource, the hub_resource distribution examination unit 303 determines to return the amount of excessive virtual resource from the entire service system to the resource table, and requests the resource pool management device 400, 410 to return the amount of excessive virtual resource via the pool association unit 305. When the hub_resource excessive/lacking amount indicates the amount of lacking virtual resource, the hub_resource distribution examination unit 303 determines to add the lacking amount to the amount of allocated virtual resource allocated to the entire service system, and requests the resource pool management device 400, 410 to permit to add the amount of lacking virtual resource via the pool association unit 305. When the resource pool management device 400, 410 responds to the request, the hub_resource distribution examination unit 303 confirms to return or add the virtual resource.

The hub_resource redistribution unit 304 determines to recover the amount of excessive virtual resource or determines to add the amount of lacking virtual resource per service system. A virtual resource to be added to the service system lacking in the virtual resource is allocated from the amount of allocated virtual resource permitted to be newly added or the amount of resource to be recovered from the service system having the excessive virtual resource.

The pool association unit 305 requests the resource pool management device 400, 410 to permit to return the amount of excessive virtual resource or to add the amount of lacking virtual resource according to the hub_resource distribution examination unit 303.

The service association unit 302, the hub_resource distribution examination unit 303, the hub_resource redistribution unit 304, and the pool association unit 305 are realized by the CPU in a computer operating according to a hub device program, for example. For example, the CPU may read the hub device program thereby to operate as the service association unit 302, the hub_resource distribution examination unit 303, the hub_resource redistribution unit 304, and the pool association unit 305 according to the program. The hub device program may be stored in a computer readable recording medium. Each component may be realized in different hardware.

The resource pool management device 400, 410 notifies the amount of allocated virtual resource permitted to be allocated to each entire service system to the hub device 300 in response to a request from the hub device 300.

The resource pool management device is provided per type of a virtual resource. For example, the virtual resources for which the allocated amount is to be controlled are assumed as virtual CPU and virtual RAM. In this case, the resource pool management device corresponding to the virtual CPU and the resource pool management device corresponding to the virtual RAM are provided, respectively. According to the present exemplary embodiment, the description will be made assuming that the resource pool management device 400 corresponds to the virtual CPU and the resource pool management device 410 corresponds to the virtual RAM. The description will be made below assuming two resource pool management devices, but the number of resource pool management devices is not limited to two, and is determined depending on the number of types of virtual resources.

The description will be made below by way of the resource pool management device 400, but the resource pool management devices 400 and 410 have the same structure.

The resource pool management device 400 includes a pool information storage device 401, a hub association unit 402, and an allocation change unit 403.

The pool information storage device 401 stores therein a pool_hub_resource distribution table and a pool_resource capacity table.

FIG. 12 is an explanatory diagram illustrating an exemplary pool_hub_resource distribution table. The pool_hub_resource distribution table stores therein hub ID of the hub device 300 as a communication party, ID (pool ID) of the resource pool management device 400, hub_resource amount, hub_resource excessive/lacking amount, and resource type in an associated manner. The resource pool management device 400 corresponds to the virtual CPU, and thus the resource type "CPU" is stored (see FIG. 12). As described above, the hub_resource amount is the amount of allocated virtual resource currently allocated to all the service systems 100 and 110. In the present example, the virtual resource is the virtual CPU. The hub_resource excessive/lacking amount is the amount of excessive/lacking resource in all the service systems 100 and 110.

FIG. 13 is an explanatory diagram illustrating an exemplary pool_resource capacity table. The pool_resource capacity table stores therein pool ID, pool_allocation capacity, pool_resource capacity, resource type, and resource unit in an associated manner. The resource pool management device 400 corresponds to the virtual CPU, and thus the resource type "CPU" is stored (see FIG. 13). The pool_allocation capacity is the amount of allocated virtual resource currently allocated to all the service systems 100 and 110. The pool_resource capacity is a maximum value of the amount of allocated virtual resource allocatable to all the service systems 100 and 110. The resource unit indicates a unit to return or add a virtual resource. The example illustrated in FIG. 13 indicates a case in which the virtual CPU is returned or added in units of virtual CPUcore.

FIG. 12 and FIG. 13 illustrate the pool_hub_resource distribution table and the pool_resource capacity table stored in the resource pool management device 400 corresponding to the virtual CPU by way of example. FIG. 14 illustrates an exemplary pool_hub_resource distribution table stored in the pool information storage device 401 in the resource pool management device 410 corresponding to the virtual RAM. FIG. 15 illustrates an exemplary pool_resource capacity table stored in the pool information storage device 401 in the resource pool management device 410 corresponding to the virtual RAM. The example illustrated in FIG. 15 indicates a case in which the virtual RAM is returned or added in units of 1 GB.

The hub association unit 402 receives a request to return the amount of excessive virtual resource or to add the amount of lacking virtual resource from the pool association unit 305, and stores the excessive amount or the lacking amount as the "hub_resource excessive/lacking amount" in the pool_hub_resource distribution table (see FIG. 12). When the amount of allocated virtual resource permitted to be allocated to each entire service system is changed, the hub association unit 402 notifies the changed allocated amount to the service management device.

The allocation change unit 403 confirms the hub_resource excessive/lacking amount (see FIG. 12) every certain period of time, and changes the amount of allocated virtual resource permitted to be allocated to each entire service system depending on the hub_resource excessive/lacking amount. Therefore, a request from the hub device 300 and a notification of the allocated amount from the resource pool management device to the hub device 300 are made asynchronously.

The hub association unit 402 and the allocation change unit 403 are realized by the CPU in a computer operating according to a resource pool management device program, for example. For example, the CPU may read the resource pool management device program thereby to operate as the hub association unit 402 and the allocation change unit 403 according to the program. The resource pool management device program may be stored in a computer readable recording medium.

A processing progress of the present invention will be described below.

Figure 16:
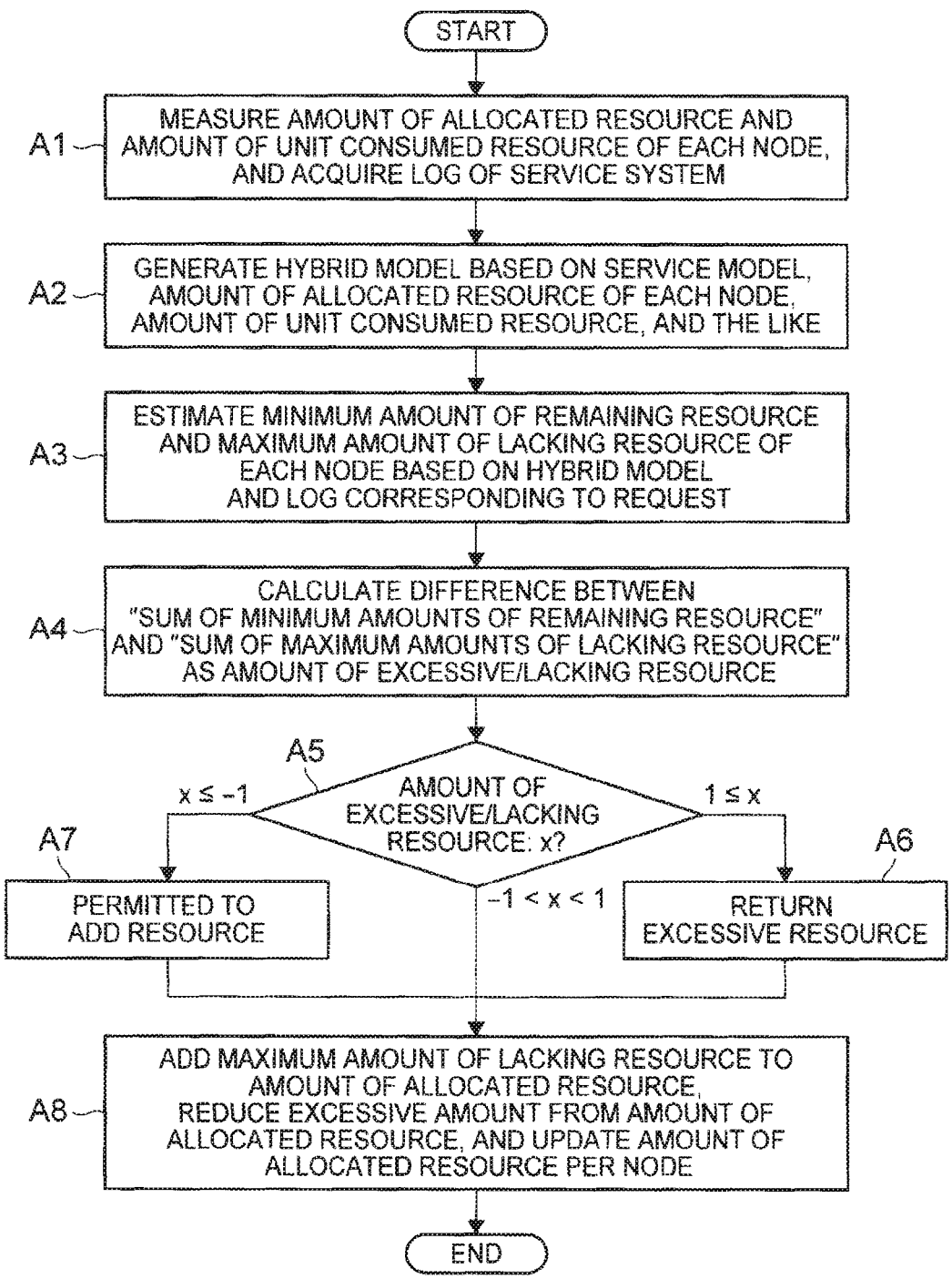
FIG. 16 It depicts a flowchart illustrating an exemplary processing progress of a service management device.

FIG. 16 is a flowchart illustrating an exemplary processing progress of the service management device. The description will be made herein by way of the service management device 200, but is similarly made by way of other service management device 210.

At first, the monitoring unit 202 measures the amount of resource allocated to each node in the service system 100 corresponding to the service management device 200, and the amount of unit consumed resource of each node. The monitoring unit 202 stores the measurement results as the amount of allocated resource and the amount of consumed resource in the node_resource table (see FIG. 3), respectively. The monitoring unit 202 performs the processings per type of a virtual resource such as virtual CPU or virtual RAM. The monitoring unit 202 measures an average processing time of each node in the service system 100, and stores it in the node_resource table. Further, the monitoring unit 202 acquires a log from the service system 100 and stores it in the service log table (see FIG. 4) (step A1).

The hybrid model generation unit 203 then generates a hybrid model based on the amount of allocated resource, the amount of consumed resource, and the average processing time in the node_resource table (or the amount of allocated resource, the amount of unit consumed resource, and the average processing time of each node measured in step A1), as well as the service model (see FIG. 7) previously stored in the service_model table, and stores it in the service_model table (step A2).

The hybrid model generation unit 203 generates a resource model (see FIG. 8) for a combination of input and output of a node of interest per node. The hybrid model generation unit 203 defines the amount of unit consumed resource of each virtual resource of the node of interest as the amount of unit consumed resource 20 (see FIG. 8) in the resource model. Further, the allocated amount of each virtual resource in the node of interest is defined as an initial value of the amount of unused resource, and the amount of using resource of each virtual resource is defined at an initial value of 0. An average processing time of the node of interest is defined as a processing time after a request is made.

In this way, the hybrid model generation unit 203 generates the resource model per node, and generates the hybrid model (see FIG. 9) with each resource model associated with input and output of the node in the service model.

A behavior of the service system and a consumption situation of the virtual resource can be collectively reproduced by use of the hybrid model. Consequently, it is possible to reproduce when, at which node, and how much a virtual resource is lacking or excessive. The lacking amount or the excessive amount of the virtual resource is used as a solution to redistribution of the virtual resource.

The node_resource amount estimation unit 204 estimates a resource consumption situation by simulating a change in the amount of unused resource and the amount of using resource of each node assuming that each request indicated in the service_log table (see FIG. 4) is made at a time indicated by a time stamp (step A3). Then, in step A3, the node_resource amount estimation unit 204 finds the minimum amount of remaining resource and the maximum amount of lacking resource at each node per type of a virtual resource.

In step A3, when one request is made, the node_resource amount estimation unit 204 reduces the amount of unused resource of each virtual resource at the initial node by the amount of unit consumed resource. At this time, the node_resource amount estimation unit 204 increases the amount of using resource of each virtual resource of the node by the amount of unit consumed resource. Each time a request is made, the node_resource amount estimation unit 204 performs the same processings. Further, when an average processing time of the node elapses after one request is made, the node_resource amount estimation unit 204 reduces the amount of using resource of each virtual resource by the amount of unit consumed resource, and increases the amount of unused resource of each virtual resource by the amount of unit consumed resource. That is, the virtual resource determined as being in use is returned to the unused state.

In this way, the node_resource amount estimation unit 204 changes the amount of unused resource and the amount of using resource in the resource model in the hybrid model. The values of the amounts of resource are updated as needed in the circles 23 and 24 illustrated in FIG. 8 (see FIG. 9).

When an additional request is made until an average processing time elapses after a request is made, the amount of unused resource of each virtual resource further reduces. At this time, if the amount of unused resource is smaller than the amount of unit consumed resource when a request is newly made, the node_resource amount estimation unit 204 keeps the processings on the request standby in the simulation. That is, the node_resource amount estimation unit 204 does not update the amount of unused resource and the amount of using resource, and keeps the processing on the newly-made request standby until the processing time for the previously-made request elapses and the amount of unused resource increases. The number of standby requests (the number of waiting requests) is not limited to one, and may be two or more. Assuming that the processing depending on a waiting request is started when the amount of unused resource increases and the amount of unused resource is larger than the amount of unit consumed resource, the node_resource amount estimation unit 204 updates the amount of unused resource and the amount of using resource again.

When many types of virtual resources are present, a newly-made request is assumed in the standby state when the amount of unused resource of at least one type of virtual resource is smaller than the amount of unit consumed resource. Then, assuming that the processing depending on a request is started under the condition that the amounts of unused resources of all the types of virtual resources are larger than the amounts of unit consumed resources, respectively, the node_resource amount estimation unit 204 makes the simulation.

Assuming that when one node terminates the processing, a next node starts the processing, the node_resource amount estimation unit 204 similarly updates the amount of unused resource and the amount of using resource also at other nodes.

The node_resource amount estimation unit 204 monitors a change in each virtual resource of each node in the above simulation, specifies the minimum amount of remaining resource and the maximum amount of lacking resource of each virtual resource of each node, and stores them in the node_resource table (see FIG. 3). The node_resource amount estimation unit 204 may calculate the product of the maximum number of standby requests and the amount of unit consumed resource of a node of interest as the maximum amount of lacking resource of the node.

When storing in the node_resource table, the node_resource amount estimation unit 204 truncates the minimum amount of remaining resource to an integer, and rounds the maximum amount of lacking resource to an integer. According to the present exemplary embodiment, there will be assumed that the unit amount for returning or adding a virtual resource (which will be denoted as unit amount below) is indicated as "1." For example, there will be assumed that the unit amount of the virtual CPU is "1 virtual CPUcore," and the unit amount of the virtual RAM is "1 GB." The minimum amount of remaining resource and the maximum amount of lacking resource are truncated or rounded to integers so that the minimum amount of remaining resource and the maximum amount of lacking resource are integral multiples of the unit amount, respectively.

The service_resource distribution examination unit 205 calculates a result obtained by subtracting the absolute value of the sum of the maximum amounts of lacking resource of the respective nodes from the absolute value of the sum of the minimum amounts of remaining resource of the respective nodes as the amount of excessive/lacking resource per type of a virtual resource, and stores it in the service_resource distribution table (see FIG. 5) (step A4).

The processings after step A4 are performed per resource type (per type of a virtual resource). For example, the service management device 200 performs the processings after step A4 on the virtual CPU, and performs the processings after step A4 also on the virtual RAM. The processings after step A4 are performed on other type of a virtual resource if any.

After step A4, the service_resource distribution examination unit 205 compares the amount of excessive/lacking resource calculated for a resource type of interest with the unit amount (step A5). The unit amount of excessive resource will be denoted as "1" below. The unit amount of lacking resource will be denoted as "−1" below.

When the amount of excessive/lacking resource is 1 or more, the service_resource distribution examination unit 205 determines to return the amount of excessive/lacking resource (the amount of excessive resource in this case) to the resource pool, and requests the hub device 300 to return the amount of excessive virtual resource via the hub association unit 207. At this time, the service_resource distribution examination unit 205 transmits the amount of excessive/lacking resource to the hub device 300 via the hub association unit 207. When notified of the new amount of allocated resource in which the amount of excessive resource is reduced (the amount of allocated resource to the total nodes in the service system 100) from the hub device 300, the service_resource distribution examination unit 205 confirms to return the virtual resource (step A6). Specifically, the service_resource distribution examination unit 205 stores the new amount of allocated resource notified from the hub device 300 in the service_resource distribution table, and erases the amount of excessive/lacking resource from the service_resource distribution table. The processing proceeds to step A8 after step A6.

When the amount of excessive/lacking resource is −1 or less, the service_resource distribution examination unit 205 determines to add the virtual resource having the amount of excessive/lacking resource (the amount of lacking resource in this case), and requests the hub device 300 to permit to add the lacking amount via the hub association unit 207. At this time, the service_resource distribution examination unit 205 transmits the amount of excessive/lacking resource to the hub device 300 via the hub association unit 207. When notified of the new amount of allocated resource in which the amount of lacking resource is increased (the amount of allocated resource to the total nodes in the service system 100) from the hub device 300, the service_resource distribution examination unit 205 confirms to add the virtual resource (step A7). Specifically, the service_resource distribution examination unit 205 stores the new amount of allocated resource notified from the hub device 300 in the service_resource distribution table, and erases the amount of excessive/lacking resource from the service_resource distribution table. The processing proceeds to step A8 after step A7.

A request from each service management device 200, 210 to the hub device 300 and a response from the hub device 300 are made asynchronously. Therefore, a period after the service management device makes a request to the hub device 300 and before the hub device 300 responds thereto in steps A6 and A7 is not constant.

When the amount of excessive/lacking resource is larger than −1 and less than 1, the processing proceeds to step A8 after step A5.

In step A8, the resource redistribution unit 206 determines to recover the virtual resource having the minimum amount of remaining resource from a node with a positive value of the minimum amount of remaining resource. Specifically, the resource redistribution unit 206 subtracts the minimum amount of remaining resource from the amount of allocated resource of the node with a positive value of the minimum amount of remaining resource in the node_resource table (see FIG. 3), thereby updating the amount of allocated resource. The resource redistribution unit 206 determines to add the virtual resource having the maximum amount of lacking resource to a node with a negative value of the maximum amount of lacking resource. Specifically, the resource redistribution unit 206 adds the amount of resource corresponding to the maximum amount of lacking resource to the amount of allocated resource of the node with a negative value of the maximum amount of lacking resource in the node_resource table (see FIG. 3), thereby updating the amount of allocated resource. The resource redistribution unit 206 erases the minimum amount of remaining resource and the maximum amount of lacking resource of the node for which the amount of allocated resource is updated.

After step A8, an operator of the service system 100 physically updates the distributed virtual resource of each node in the service system 100 according to the amount of allocated resource with reference to the updated amount of allocated resource in the node_resource table. A means for automatically and physically updating an allocated virtual resource of each node in the service system 100 according to the updated amount of allocated resource in the node_resource table may be provided in each service management device 200, 210.

Figure 17:
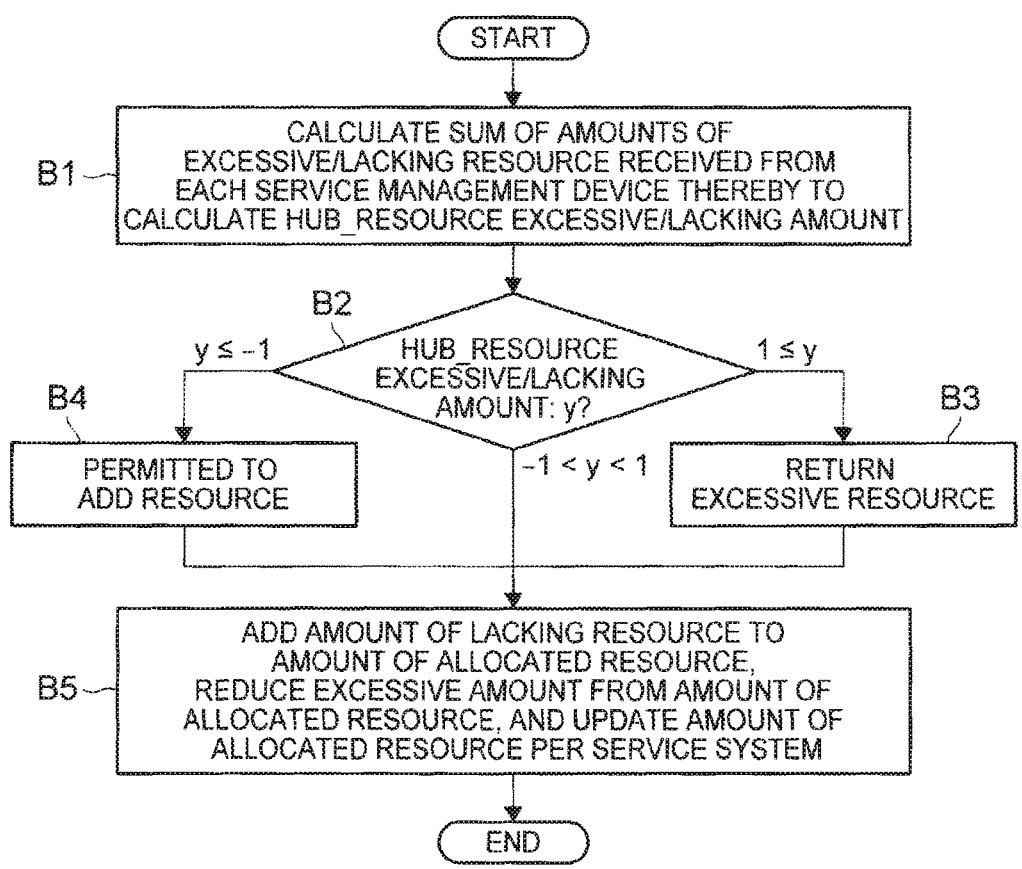
FIG. 17 It depicts a flowchart illustrating an exemplary processing progress of a hub device.

FIG. 17 is a flowchart illustrating an exemplary processing progress of the hub device 300. The service association unit 302 in the hub device 300 receives information on the amount of excessive/lacking resource when receiving a request to return the amount of excessive virtual resource (step A6 illustrated in FIG. 16) or a request to permit to add the amount of lacking virtual resource (step A7 illustrated in FIG. 16) from each service management device 200, 210. At this time, the service association unit 302 stores the received amount of excessive/lacking resource as the amount of excessive/lacking resource corresponding to the service ID of the request source service management device and the resource type for a request to return or add in the hub_service_resource distribution table (see FIG. 10).

The hub device 300 performs the processings in steps B1 to B5 described below per resource type.

The hub_resource distribution examination unit 303 reads the hub_service_resource distribution table every certain period of time, and calculates the sum of the read amounts of excessive/lacking resource. The hub_resource distribution examination unit 303 stores the calculation result as the hub_resource excessive/lacking amount of a resource type of interest in the hub_resource distribution table (see FIG. 11) (step B1).

After step B1, the hub_resource distribution examination unit 303 compares the hub_resource excessive/lacking amount calculated in step B1 with the unit amount of the resource type of interest (step B2). As described above, the unit amount of excessive resource is denoted as "1." The unit amount of lacking resource is denoted as "−1."

When the hub_resource excessive/lacking amount is 1 or more, the hub_resource distribution examination unit 303 determines to return the hub_resource excessive/lacking amount (the amount of excessive resource in this case) to the resource pool, and requests the resource pool management device corresponding to the resource type of interest to return the amount of excessive virtual resource via the pool association unit 305. The description will be made assuming that the resource type of interest is a virtual CPU and a request is made to the resource pool management device 400. When making the request, the hub_resource distribution examination unit 303 transmits the hub_resource excessive/lacking amount to the resource pool management device 400. When notified of the new amount of allocated resource in which the excessive amount is reduced (the amount of allocated resource to each entire service system 100, 110) from the resource pool management device 400, the hub_resource distribution examination unit 303 then confirms to return the virtual resource (step B3). Specifically, the hub_resource distribution examination unit 303 stores the new amount of allocated resource notified from the resource pool management device 400 as the hub_resource amount in the hub_resource distribution table (see FIG. 11), and erases the hub_resource excessive/lacking amount from the hub_resource distribution table. The processing proceeds to step B5 after step B3.

When the hub_resource excessive/lacking amount is −1 or less, the hub_resource distribution examination unit 303 determines to add the virtual resource having the hub_resource excessive/lacking amount (the amount of lacking resource in this case), and requests the resource pool management device 400 corresponding to a resource type of interest to permit to add the lacking amount via the pool association unit 305. When making the request, the hub_resource distribution examination unit 303 transmits the hub_resource excessive/lacking amount to the resource pool management device 400. When notified of the new amount of allocated resource in which the amount of lacking resource is increased (the amount of allocated resource to each entire service system 100, 110) from the resource pool management device 400, the hub_resource distribution examination unit 303 then confirms to add the virtual resource (step B4). Specifically, the hub_resource distribution examination unit 303 stores the new amount of allocated resource notified from the resource pool management device 400 as the hub_resource amount in the hub_resource distribution table, and erases the hub_resource excessive/lacking amount from the hub_resource distribution table. The processing proceeds to step B5 after step B4.

A request from the hub device 300 to the resource pool management device 400 and a response from the resource pool management device 400 are made asynchronously. Therefore, a period after the hub device 300 makes a request to the resource pool management device 400 and before the resource pool management device 400 responds thereto in steps B3 and B4 is not constant. This is similarly applicable also when the hub device 300 makes a request to other resource pool management device 410.

When the hub_resource excessive/lacking amount is larger than −1 and less than 1, the processing proceeds to step B5 after step B2.

In step B5, the hub_resource redistribution unit 304 determines to recover a virtual resource having the amount of excessive/lacking resource (the amount of excessive resource in this case) from the service system with a positive value of the amount of excessive/lacking resource of the virtual resource of interest in the hub_service_resource distribution table. Specifically, the hub_resource redistribution unit 304 subtracts a positive value of the amount of excessive/lacking resource (the amount of excessive resource) from the "amount of resource" of the virtual resource of interest in the hub_service_resource distribution table (see FIG. 10), thereby updating the "amount of resource." The hub_resource redistribution unit 304 determines to add the virtual resource having the amount of excessive/lacking resource (the lacking amount in this case) to the service system with a negative value of the amount of excessive/lacking resource of the virtual resource of interest in the hub_service_resource distribution table. Specifically, the hub_resource redistribution unit 304 adds the amount of resource corresponding to the lacking amount to the "amount of resource" of the virtual resource of interest in the hub_service_resource distribution table, thereby updating the "amount of resource." The hub_resource redistribution unit 304 erases the amount of excessive/lacking resource in the row in which the "amount of resource" is updated from the hub_service_resource distribution table.

Then, in step B5, the hub_resource redistribution unit 304 transmits the updated "amount of resource" to the service management device 200 specified by the service ID corresponding to the "amount of resource" via the service association unit 302.

Figure 18:
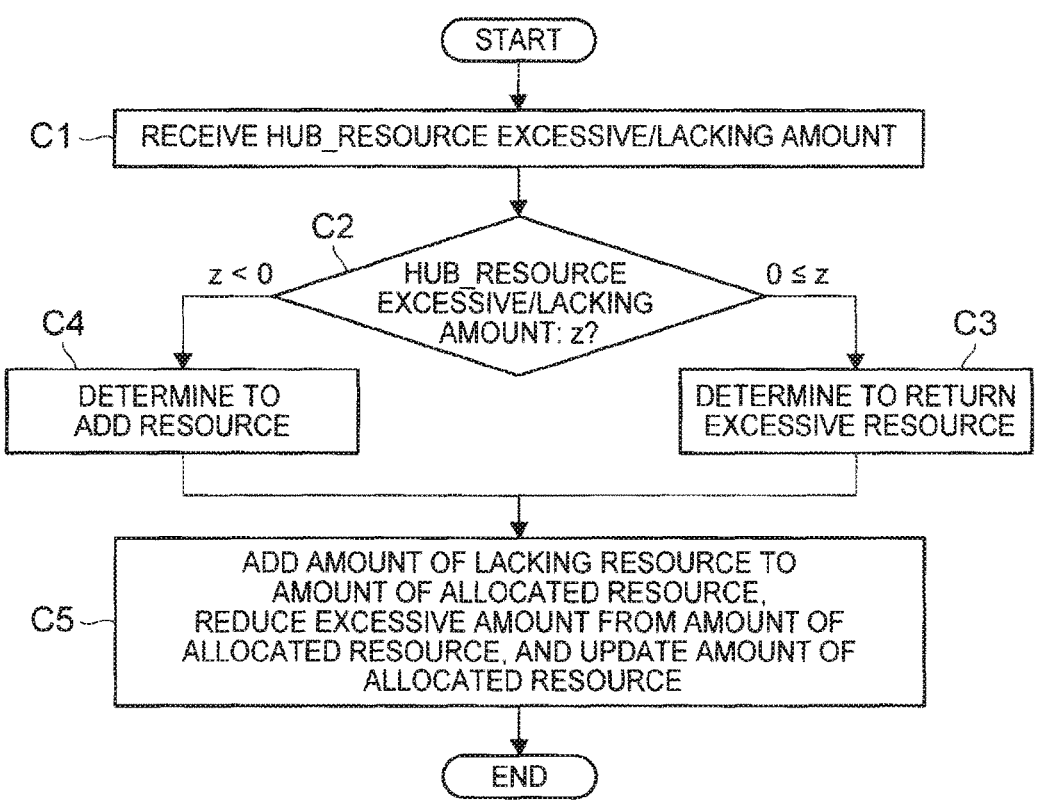
FIG. 18 It depicts a flowchart illustrating an exemplary processing progress of a resource pool management device.

FIG. 18 is a flowchart illustrating an exemplary processing progress of the resource pool management device. The description will be made herein by way of the resource pool management device 400, but is similarly made also for the processing progress of other resource pool management device 410.

The hub association unit 402 in the resource pool management device 400 receives information on the hub_resource excessive/lacking amount when receiving a request to return the amount of excessive virtual resource from the hub device 300 (step B3 illustrated in FIG. 17) or a request to permit to add the amount of lacking virtual resource (step B4 illustrated in FIG. 17). At this time, the hub association unit 402 stores the received hub_resource excessive/lacking amount in the pool_hub_resource distribution table (see FIG. 12) (step C1).

The allocation change unit 403 confirms the hub_resource excessive/lacking amount in the pool_hub_resource distribution table every certain period of time, and determines whether the hub_resource excessive/lacking amount is 0 or more (step C2).

The hub_resource excessive/lacking amount of 0 or more indicates that the virtual resource corresponding to the resource pool management device 400 (the virtual CPU in the present example) is excessive in each entire service system 100, 110. In this case, the allocation change unit 403 determines to permit to return the amount of resource corresponding to the hub_resource excessive/lacking amount (the amount of excessive resource herein) to the resource pool (step C3).

The hub_resource excessive/lacking amount of less than 0 indicates that the virtual resource corresponding to the resource pool management device 400 is lacking in each entire service system 100, 110. In this case, the allocation change unit 403 determines to newly add the amount of resource corresponding to the hub_resource excessive/lacking amount (the lacking amount herein) to each entire service system 100, 110 (step C4).

After step C3 or step C4, the allocation change unit 403 updates the pool_hub_resource distribution table and the pool_resource capacity table according to the determination in step C3 or step C4 (step C5).

Specifically, when the processing proceeds from step C3 to step C5, the allocation change unit 403 subtracts the amount of resource corresponding to the hub_resource excessive/lacking amount (the amount of excessive resource herein) from the hub_resource amount in the pool_hub_resource distribution table (see FIG. 12), thereby updating the hub_resource amount. At this time, the allocation change unit 403 erases the hub_resource excessive/lacking amount from the pool_hub_resource distribution table. Further, the allocation change unit 403 updates the pool_allocation capacity in the pool_resource capacity table at the same value as the updated hub_resource amount.

When the processing proceeds from step C4 to step C5, the allocation change unit 403 adds the amount of resource corresponding to the hub_resource excessive/lacking amount (the lacking amount herein) to the hub_resource amount in the pool_hub_resource distribution table (see FIG. 12), thereby updating the hub_resource amount. At this time, the allocation change unit 403 erases the hub_resource excessive/lacking amount from the pool_hub_resource distribution table. Further, the allocation change unit 403 updates the pool_allocation capacity in the pool_resource capacity table at the same value as the updated hub_resource amount.

The hub_resource amount in the pool_hub_resource distribution table (see FIG. 12) and the pool_allocation capacity in the pool_resource capacity table (see FIG. 13) are the amount of allocated virtual resource permitted to be allocated to each entire service system 100, 110.

Then, in step C5, the allocation change unit 403 transmits the updated hub_resource amount in the pool_hub_resource distribution table to the hub device 300 via the hub association unit 402.

According to the present invention, the node_resource amount estimation unit 204 specifies the minimum amount of remaining resource or the maximum amount of lacking resource per node in the service system by use of the hybrid model. The service_resource distribution examination unit 205 then calculates the amount of excessive/lacking resource. Therefore, the excessive amount or the lacking amount of a virtual resource in one entire service system can be grasped.

The hub device 300 then receives the excessive amount or the lacking amount of a virtual resource in one entire service system, and receives a request to return the amount of excessive virtual resource or a request to add the amount of lacking resource from the service management device 200, 210. At this time, the hub device 300 does not synchronously respond to a request from one service management device. While receiving a request from an individual service management device 200, 210, the hub device 300 does not synchronize with the individual service management device 200, 210, and grasps the excessive amount or the lacking amount of a virtual resource in each entire service system 100, 110, and notifies the new amount of allocated virtual resource to the individual service management device every certain period of time. Therefore, the amount of allocated virtual resource to an individual service system can be appropriately defined.

While the amount of allocated virtual resource to each entire service system 100, 110 is minimized, the amount of allocated virtual resource to an individual service system can be determined.

According to the present invention, the hub device 300 is provided so that a request from the service management device 200, 210 to the hub device 300 and a response from the hub device 300 for the request are made asynchronously. Therefore, when a service system is newly added, a service management device is newly added and the hub device 300 may operate also on the service management device similarly as on the service management devices 200 and 210. When an existing service system is abolished, the hub device 300 may stop the operation on the service management device corresponding to the service system. Therefore, under an environment in which a service system is added or deleted, the amount of allocated virtual resource to an individual service system can be appropriately defined.

Even if a service system is added or deleted, modification to the virtual resource control system can be restricted.

Since the hub device 300 is provided, even if types of virtual resources for which the allocated amount is to be determined are increased or reduced, modifications to the virtual resource control system can be restricted. For example, when the amount of allocated storage is also newly determined, a resource pool management device corresponding to the storage is newly provided, and the hub device 300 may operate also on the resource pool management device similarly as on the resource pool management devices 400 and 410. When types of virtual resources for which the allocated amount is to be determined are reduced, the hub device 300 may stop the operation on the resource pool management device corresponding to the virtual resource.

If the hub device 300 is not provided, m service management devices and n resource pool management devices are directly associated with each other, and each resource pool management device notifies the amount of allocated virtual resource to an individual service management device, m*n types of control environments of the amount of allocated resource have to be prepared. In this case, modifications to the entire system increases when the service management devices are increased or reduced or the resource pool management devices are increased or reduced.

To the contrary, according to the present invention, as described above, even if a service system is added or deleted or a type of a virtual resource for which the allocated amount is to be determined is added or deleted, modifications to the virtual resource control system can be restricted.

The operations according to the present invention will be described below by use of specific examples. As illustrated in FIG. 2, it is assumed that a Web server system assuming the nodes such as load balancer, firewall, Web server, App server and DB server as components operates as a service system. The service model illustrated in FIG. 7 is assumed to be previously held in the service management device 200 as a service model of such a service system, for example. In the specific examples described below, it will be assumed that the allocated amount is to be determined for two virtual resources including a virtual CPU and a virtual RAM.

In the examples described below, it will be assumed that a service system other than the service systems 100 and 110 illustrated in FIG. 1 is also present and a service management device corresponding to the service system is provided.

A specific example of the operation of the service management device will be described by way of the service management device 200. The monitoring unit 202 in the service management device 200 measures the amount of allocated resource of each node, the amount of unit consumed resource of each node, and an average processing time of each node for the nodes in the service system 100, and stores them in the node_resource table as illustrated in FIG. 3. It is assumed that the unit of the amount of consumed resource of the virtual CPU is the number of virtual CPU-core, the unit of the amount of consumed resource of the virtual RAM is Gigabytes, and the unit of the average processing time is seconds (sec). In the example illustrated in FIG. 3, the amount of allocated resource of the virtual CPU with the node "sv1_n1" and the amount of allocated resource of the virtual RAM are "2 virtual CPUcore" and "1 GB," respectively. The amount of unit consumed resource of the virtual CPU and the amount of unit consumed resource of the virtual RAM with the node "sv1_n1" are "0.5 virtual CPUcore" and "0.2 GB," respectively. The average processing time with the node "sv1_n1" is 2 sec. The hybrid model generation unit 203 generates the hybrid model illustrated in FIG. 9 by use of the amount of allocated resource, the amount of unit consumed resource, the average processing time stored in the node_resource table illustrated in FIG. 3, and the service model (see FIG. 7).

The node_resource amount estimation unit 204 simulates a behavior of the service system and a resource consumption situation by inputting each request of the service_log table (see FIG. 4) into the hybrid model. The amount of unused resource and the amount of using resource in the hybrid model illustrated in FIG. 9 indicate the values at a point of time during the simulation. For example, FIG. 9 illustrates a state in which two requests are being processed in the Web server and the virtual CPU and the virtual RAM are in use for "1 virtual CPUcore" and "0.4 GB," respectively.

If the amount of unused resource is less than the amount of unit consumed resource when a new request is made in the simulation, the node_resource amount estimation unit 204 puts the request in the standby state until the amount of unused resource reaches the amount of unit consumed resource, and increments the number of standby requests by 1. The initial value of the number of standby requests of each node is 0 at the start of the simulation. The node_resource amount estimation unit 204 calculates a product of the maximum number of standby requests and the amount of unit consumed resource during the simulation per node, and assumes the value as the maximum amount of lacking resource.

The node_resource amount estimation unit 204 measures a minimum value of the amount of unused resource of each node during the simulation, and assumes each measurement value as the minimum amount of remaining resource of each node.

The node_resource amount estimation unit 204 stores the maximum amount of lacking resource and the minimum amount of remaining resource of each node acquired by the simulation in the node_resource table. FIG. 19 illustrates an exemplary state in which the maximum amount of lacking resource and the minimum amount of remaining resource of each node are added to the node_resource table illustrated in FIG. 3.

In the example illustrated in FIG. 19, in terms of the node "sv1_n1," the maximum amount of lacking resource is −1 and the amount of unit consumed resource is 0.5, and thus the maximum number of standby requests is 1/0.5=2. The number of requests is 2/0.5=4 when the amount of allocated resource 2 is used up. Therefore, two requests are additionally made while four requests are made and the amount of allocated resource 2 is used up. At this time, the amount of lacking virtual RAM is 0.4 GB, but it is rounded to an integer, and thus the maximum amount of lacking resource of the virtual RAM is stored as −1.

In the example illustrated in FIG. 19, in terms of the node "sv1_n2," the minimum amount of remaining resource is 1. The fact indicates that the maximum number of requests processed at the same time is 4, and the minimum amount of remaining resource is 1 as a result of the use of the amount of allocated resource 4 of 0.75*4=3 at a maximum.

The service_resource distribution examination unit 205 calculates a value (the amount of excessive/lacking resource) obtained by subtracting the absolute value of the sum of the maximum amounts of lacking resource of the respective nodes from the absolute value of the sum of the minimum amounts of remaining resource of the respective nodes illustrated in FIG. 19 per resource type. The service_resource distribution examination unit 205 stores the amount of excessive/lacking resource per resource type in the service_resource distribution table as illustrated in FIG. 5.

The example illustrated in FIG. 5 indicates that 2 virtual CPUcore of the virtual CPU is lacking and 4 GB of the virtual RAM is excessive in each entire node in the service system 100. The service_resource distribution examination unit 205 transmits the amount of excessive/lacking resource "−2" for the virtual CPU to the hub device 300 via the hub association unit 207, and requests it to add 2 virtual CPUcore of the virtual CPU. Further, the service_resource distribution examination unit 205 transmits the amount of excessive/lacking resource "4" for the virtual RAM to the hub device 300 via the hub association unit 207, and requests it to return 4 GB of the virtual RAM from the service system 100.

When notified of the amount of allocated resource in which the amount of resource of the virtual RAM is reduced by 4 GB from the current status from the hub device 300, the service_resource distribution examination unit 205 stores the amount of allocated resource in the service_resource distribution table (see FIG. 5), and erases the amount of excessive/lacking resource in the row. Similarly, when notified of the amount of allocated resource in which 2 virtual CPUcore is added to the current amount of resource of the virtual CPU from the hub device 300, the service_resource distribution examination unit 205 stores the amount of allocated resource in the service_resource distribution table (see FIG. 5), and erases the amount of excessive/lacking resource in the row.

In the present example, the amount of resource of the virtual CPU illustrated in FIG. 5 is updated from "15" to "17," and the amount of resource of the virtual RAM illustrated in FIG. 5 is updated from "21" to "17." Then, the amounts of excessive/lacking resources illustrated in FIG. 5 are erased.

The resource redistribution unit 206 then adds the maximum amount of lacking resource to the amount of allocated resource in the row in which the maximum amount of lacking resource is negative in the node_resource table illustrated in FIG. 19, thereby updating the amount of allocated resource. The resource redistribution unit 206 then deletes the maximum amount of lacking resource. The resource redistribution unit 206 subtracts the minimum amount of remaining resource from the amount of allocated resource in the row in which the minimum amount of remaining resource is positive, thereby updating the amount of allocated resource. The resource redistribution unit 206 then deletes the minimum amount of remaining resource.

FIG. 20 illustrates a state in which the node_resource table illustrated in FIG. 19 is updated. For example, the allocated amount of the virtual CPU and the allocated amount of the virtual RAM in the node "sv1_n1" are updated to 3 virtual CPUcore and 2 GB, respectively (see FIG. 20).

Other service management device performs the same operation.

A specific example of the operation of the hub device 300 will be described below. When receiving the amount of excessive/lacking resource together with a request to return or add a virtual resource, the service association unit 302 in the hub device 300 stores the amount of excessive/lacking resource in the hub_service_resource distribution table as illustrated in FIG. 10. The example illustrated in FIG. 10 indicates a case in which the amount of excessive/lacking resource of each resource type is received from the service management device 200 corresponding to the service ID "sv1" and the service management device 210 corresponding to the service ID "sv2."

The hub_resource distribution examination unit 303 reads the hub_service_resource distribution table every certain period of time (every five minutes, for example), calculates the sum of the amounts of excessive/lacking resource per resource type, and stores it as the hub_resource excessive/lacking amount in the hub_resource distribution table (see FIG. 11). In the example illustrated in FIG. 11, it is estimated that 5 virtual CPUcore of the virtual CPU is lacking and 8 GB of the virtual RAM is excessive in each entire service system 100, 110.

The hub_resource distribution examination unit 303 transmits the hub_resource excessive/lacking amount of "−5" to the resource pool management device 400 corresponding to the virtual CPU. The hub_resource distribution examination unit 303 then requests to add 5 virtual CPUcore as the allocated amount of the virtual CPU to the entire service system 100, 110. Further, the hub_resource distribution examination unit 303 transmits the hub_resource excessive/lacking amount of "8" to the resource pool management device 410 corresponding to the virtual RAM, and requests to return 8 GB of the virtual RAM from the entire service system 100, 110.

When notified of the amount of allocated resource in which 5 virtual CPUcore is added to the current amount of resource of the virtual CPU from the resource pool management device 400, the hub_resource distribution examination unit 303 stores the amount of allocated resource as the hub_resource amount in the hub_resource distribution table. The hub_resource distribution examination unit 303 erases the hub_resource excessive/lacking amount in the row.

Similarly, when notified of the amount of allocated resource in which the virtual RAM is reduced by 8 GB from the current amount of resource from the resource pool management device 410, the hub_resource distribution examination unit 303 stores the amount of allocated resource as the hub_resource amount in the hub_resource distribution table. The hub_resource distribution examination unit 303 erases the hub_resource excessive/lacking amount in the row.

FIG. 21 illustrates a state in which the hub_resource distribution table illustrated in FIG. 11 is updated.

Further, the hub_resource redistribution unit 304 adds the amount of excessive/lacking resource to the amount of resource in the row in which the amount of excessive/lacking resource is negative in the hub_service_resource distribution table illustrated in FIG. 10, thereby updating the amount of resource and erasing the amount of excessive/lacking resource. Furthermore, the hub_resource redistribution unit 304 subtracts the amount of excessive/lacking resource from the amount of resource in the row in which the amount of excessive/lacking resource is positive, thereby updating the amount of resource and erasing the amount of excessive/lacking resource. FIG. 22 illustrates a state in which the hub_service_resource distribution table illustrated in FIG. 10 is updated.

The hub_resource redistribution unit 304 then transmits the amount of resource illustrated in FIG. 22 to each service management device corresponding to a service ID.

A specific example of the operation of the resource pool management device will be described below by way of the resource pool management device 400 corresponding to the virtual CPU. When receiving the hub_resource excessive/lacking amount together with a request to return or add the virtual resource from the hub device 300, the hub association unit 402 in the resource pool management device 400 stores the hub_resource excessive/lacking amount in the pool_hub_resource distribution table as illustrated in FIG. 12.

The allocation change unit 403 confirms the hub_resource excessive/lacking amount in the pool_hub_resource distribution table every certain period of time (every 10 minutes, for example). When the hub_resource excessive/lacking amount is negative, the allocation change unit 403 adds the amount of resource corresponding to the hub_resource excessive/lacking amount to the hub_resource amount, thereby updating the hub_resource amount. Further, when the hub_resource excessive/lacking amount is positive, the allocation change unit 403 subtracts the amount of resource corresponding to the hub_resource excessive/lacking amount from the hub_resource amount, thereby updating the hub_resource amount. When updating the hub_resource amount, the allocation change unit 403 erases the hub_resource excessive/lacking amount. FIG. 23 illustrates a state in which the pool_hub_resource distribution table illustrated in FIG. 12 is updated.

Further, the allocation change unit 403 updates the pool_allocation capacity in the pool_resource capacity table illustrated in FIG. 13 at the same value as the updated hub_resource amount. FIG. 24 illustrates a state in which the pool_resource capacity table illustrated in FIG. 13 is updated.

The allocation change unit 403 then transmits the updated hub_resource amount in the pool_hub_resource distribution table to the hub device 300 via the hub association unit 402.

The description has been made herein by way of the resource pool management device 400 corresponding to the virtual CPU. The resource pool management device 410 corresponding to the virtual RAM operates in the same way. It is assumed that the resource pool management device 410 receives the hub_resource excessive/lacking amount together with a request to return or add the virtual resource from the hub device 300 so that the pool_hub_resource distribution table of the resource pool management device 410 is in the state illustrated in FIG. 14. It is further assumed that the pool_resource capacity table of the resource pool management device 410 is in the state illustrated in FIG. 15. In this case, the pool_hub_resource distribution table illustrated in FIG. 14 is updated to the state illustrated in FIG. 25. Further, the pool_resource capacity table illustrated in FIG. 15 is updated to the state illustrated in FIG. 26.

Main components according to the present invention will be described below. FIG. 27 is a block diagram illustrating the main components according to the present invention. A virtual resource control system according to the present invention includes service management devices 50, a hub device 60, and resource management devices 70.

The service management device 50 (the service management device 200, 210, for example) corresponds to a service system for providing a service on a one-to-one basis, and defines the amount of allocated virtual resource to an individual node in the corresponding service system.

The hub device 60 (the hub device 300, for example) receives the amount of excessive/lacking resource indicating the lacking amount or the excessive amount of the amount of allocated virtual resource to one entire service system corresponding to the service management device 50 from the service management device 50, and notifies the amount of allocated virtual resource to one entire service system corresponding to the service management device 50 to the service management device 50.

The resource management device 70 (the resource pool management device 400, 410, for example) calculates the amount of allocated virtual resource to each entire service system.

The service management device 50 includes a model holding means 51, a monitoring means 52, a model generation means 53, a resource excessive/lacking amount calculation means 54, and a virtual resource allocated amount update means 55.

The model holding means 51 (the service information storage device 201 for storing a service model table, for example) holds a service model for expressing input and output of each node in the service system corresponding to the device in order of processings.

The monitoring means 52 (the monitoring unit 202, for example) measures the amount of allocated virtual resource, the amount of unit consumed resource as the amount of virtual resource consumed per request, and an average processing time for each node in the service system, and acquires a log indicating a request made in the service system.

The model generation means 53 (the hybrid model generation unit 203, for example) generates a resource model expressing the amount of unused resource and the amount of using resource of each node on input into the node based on the amount of allocated virtual resource, the amount of unit consumed resource, the average processing time of the node, and the service model, and generates a hybrid model in a combination of the service model and the resource model.

The resource excessive/lacking amount calculation means 54 (the service_resource distribution examination unit 205, for example) simulates a resource consumption situation of each node in the service system by use of the hybrid model and the log, calculates the minimum amount of remaining resource as a minimum value of the amount of remaining virtual resource and the maximum amount of lacking resource as a maximum value of the amount of lacking virtual resource per node, calculates the amount of excessive/lacking resource based on the minimum amount of remaining resource and the maximum amount of lacking resource per node, notifies the amount of excessive/lacking resource to the hub device 60, and receives a notification of the amount of allocated virtual resource to one entire service system corresponding to the service management device in which the lacking amount or the excessive amount indicated by the amount of excessive/lacking resource is eliminated from the hub device 60.

The virtual resource allocated amount update means 55 (the resource redistribution unit 206, for example) updates the amount of allocated virtual resource in order to eliminate the minimum amount of remaining resource or the maximum amount of lacking resource per node.

The hub device 60 includes a resource excessive/lacking amount holding means 61, a total resource excessive/lacking amount calculation means 62, and a system-based virtual resource allocated amount calculation means 63.

The resource excessive/lacking amount holding means 61 (the hub information storage device 301 for storing hub_service_resource distribution, for example) holds the amount of excessive/lacking resource notified from each service management device 50.

The total resource excessive/lacking amount calculation means 62 (the hub_resource distribution examination unit 303, for example) calculates the total amount of excessive/lacking resource (the hub_resource excessive/lacking amount, for example) expressing the lacking amount or the excessive amount of the amount of allocated virtual resource to each entire service system based on the amount of excessive/lacking resource notified from each service management device 50 every certain period of time, notifies the total amount of excessive/lacking resource to the resource management device 70, and receives a notification of the amount of allocated virtual resource to each entire service system in which the total amount of excessive/lacking resource is eliminated from the resource management device 70.

The system-based virtual resource allocated amount calculation means 63 (the hub_resource redistribution unit 304, for example) calculates the amount of allocated virtual resource to one entire service system corresponding to the service management device in which the lacking amount or the excessive amount indicated by the amount of excessive/lacking resource is eliminated, and notifies the allocated amount to the service management device which has transmitted the amount of excessive/lacking resource.

The resource management device 70 includes a total resource excessive/lacking amount holding means 71, and a total virtual resource allocated amount calculation means 72.

The total resource excessive/lacking amount holding means 71 (the pool information storage device 401 for storing a pool_hub_resource distribution table, for example) holds the total amount of excessive/lacking resource notified from the hub device 60.

The total virtual resource allocated amount calculation means 72 (the allocation change unit 403, for example) confirms the total amount of excessive/lacking resource every certain period of time, calculates the amount of allocated virtual resource to each entire service system in which the total amount of excessive/lacking resource is eliminated, and notifies the allocated amount to the hub device 60.

With the structure, under an environment in which a service system is added or deleted, the amount of allocated virtual resource to an individual service system can be appropriately defined.

The resource management device 70 may be provided per type of a virtual resource.

There may be configured such that the resource excessive/lacking amount calculation means 54 calculates the minimum amount of remaining resource, the maximum amount of lacking resource, and the amount of excessive/lacking resource per type of a virtual resource, the virtual resource allocated amount update means 55 updates the amount of allocated virtual resource per type of a virtual resource, the resource excessive/lacking amount holding means 61 holds the amount of excessive/lacking resource notified from each service management device per type of a virtual resource, the total resource excessive/lacking amount calculation means 62 calculates the total amount of excessive/lacking resource per type of a virtual resource, and notifies the total amount of excessive/lacking resource to the resource management device depending on a type of a virtual resource, and the system-based virtual resource allocated amount calculation means 63 calculates the amount of allocated virtual resource to one entire service system corresponding to a service management device per type of a virtual resource.

The model holding means 51 may express input and output of each node in the service system in order of processings, and hold a service model expressing branch and aggregation of output of nodes.

The present invention has been described above with reference to the exemplary embodiment, but the present invention is not limited to the exemplary embodiment. The structure or details of the present invention may be variously changed within the scope of the present invention understandable by those skilled in the art.

The present application claims the priority based on Japanese Patent Application No. 2013-162456 filed on Aug. 5, 2013, the disclosure of which is all incorporated herein by reference.

INDUSTRIAL APPLICABILITY

The present invention is suitably applicable to a virtual resource control system for controlling the amounts of allocated virtual resources to a plurality of service systems.

REFERENCE SIGNS LIST 200, 210 Service management device
201 Service information storage device
202 Monitoring unit
203 Hybrid model generation unit
204 Node_resource amount estimation unit
205 Service_resource distribution examination unit
206 Resource redistribution unit
207 Hub association unit
300 Hub device
301 Hub information storage device
302 Service association unit
303 Hub_resource distribution examination unit
304 Hub_resource redistribution unit
305 Pool association unit
400 Resource pool management device
401 Pool information storage device
402 Hub association unit
403 Allocation change unit

The invention claimed is:
1. A virtual resource control system comprising:
a hub device connected to one or more service management devices, one or more resource management devices, the one or more resource management devices connected to one or more virtual resources of different types, wherein the hub device comprises at least one processor;
the one or more service management devices corresponding to one or more service systems for providing services to the one or more service systems on a one-to-one basis and directed for defining an amount of virtual resource allocated to each of the one or more service systems, wherein each service system comprises one or more nodes for processing one or more requests;
the hub device for receiving from each service management device, an amount of excessive/lacking resource indicating a lacking amount or an excessive amount of virtual resource allocated to each service system corresponding to each service management device and notifying each service management device of a new amount of virtual resource to be allocated to the service system corresponding to the service management device; and
the one or more resource management devices for calculating the new amount of virtual resource to be allocated to each service system that eliminates the amount of excessive/lacking resource,
wherein each service management device comprises:
a model holding unit for holding a service model expressing an ordered sequence of processing of one or more nodes in the service system that corresponds to the service management device, and input and output of each node in the ordered sequence;
a monitoring unit for measuring the amount of virtual resource allocated to each node of the service system, an amount of virtual resource consumed by each node in the service system, and an average processing time for each node in the service system, and recording in a log each request received by the nodes in the service system;
a model generation unit for generating a resource model expressing amount of unused resource and an amount of used resource of each node of the service system upon input into the node based on the measured amount of virtual resource allocated to each node, the measured amount of virtual resource consumed by each node, and the measured average processing time of each node in the service system, and generating a hybrid model that is a combination of the service model and the resource model;
a resource excessive/lacking amount calculation unit for simulating a resource consumption situation of each node in the service system by use of the hybrid model and the log, calculating a minimum amount of remaining resource per node as a minimum value of the measured amount of virtual resource consumed per node, and a maximum amount of lacking resource per node as a maximum value of the measured amount of virtual resource consumed per node, calculating the amount of excessive/lacking resource for the service system based on the minimum amount of remaining resource and the maximum amount of lacking resource per node, notifying the amount of excessive/lacking resource to the hub device, and receiving a notification of the new amount of virtual resource to be allocated to the service system corresponding to the service management device such that the lacking amount or the excessive amount indicated by the amount of excessive/lacking resource in the service system is eliminated;
a resource redistribution unit causing the new amount of virtual resource to be allocated among the one or more nodes of the service system; and
a virtual resource allocated amount update unit for updating the amount of virtual resource allocated to each node in the service system based on the new amount of virtual resource allocated among the one or more nodes;
the hub device comprises:
a resource excessive/lacking amount holding unit for holding the amount of excessive/lacking resource notified from each of the one or more service management devices;
a total resource excessive/lacking amount calculation unit for calculating a total amount of excessive/lacking resource indicating the total lacking amount or the total excessive amount of the amount of virtual resource allocated across all of the one or more service systems based on the total amount of excessive/lacking resource notified from each service management device, the calculating of the total amount of excessive/lacking resource being performed at a certain periodicity, notifying the total amount of excessive/lacking resource to the one or more resource management devices, and receiving a notification of a new total amount of virtual resource to be allocated among the one or more service systems such that the total amount of excessive/lacking resource is eliminated;
a system-based virtual resource allocated amount calculation unit for calculating, for each service system, the new amount of virtual resource to be allocated to each service system from the new total amount of virtual resource to be allocated across all of the service systems, such that the lacking amount or the excessive amount indicated by the amount of excessive/lacking resource in the notification sent by each service management device is eliminated, and notifying the new amount to each service management device; and each of the one or more resource management devices comprises:

a total resource excessive/lacking amount holding unit for holding the total amount of excessive/lacking resource notified from the hub device;

a total virtual resource allocated amount calculation unit for confirming the total amount of excessive/lacking resource at the certain periodicity, calculating the new total amount of virtual resource to be allocated across all of the one or more service systems such that the total amount of excessive/lacking resource is eliminated, and notifying the new total amount to the hub device to be distributed among the service systems.

2. The virtual resource control system according to claim 1, comprising a resource management device per each type of virtual resource.

3. The virtual resource control system according to claim 2,
wherein the resource excessive/lacking amount calculation unit calculates the minimum amount of remaining resource, the maximum amount of lacking resource, and the amount of excessive/lacking resource per each type of virtual resource,
the virtual resource allocated amount update unit updates the amount of virtual resource allocated per each type of virtual resource,
the resource excessive/lacking amount holding unit holds the amount of excessive/lacking resource notified from each service management device per each type of virtual resource,
the total resource excessive/lacking amount calculation unit calculates the total amount of excessive/lacking resource per each type of virtual resource, and notifies the total amount of excessive/lacking resource to the one or more resource management device depending on the type of virtual resource, and
the system-based virtual resource allocated amount calculation unit calculates, for each service system of the one or more service systems, the new amount of virtual resource to be allocated to the service system per each type of virtual resource.

4. The virtual resource control system according to claim 1, wherein the model holding unit expresses branching and aggregation of the output of the ordered sequence of nodes.

5. A virtual resource control method using a hub device connected to one or more service management devices, and one or more resource management devices, the one or more resource management devices connected to one or more virtual resources of different types,
the one or more service management devices corresponding to one or more service systems for providing services to the one or more service systems on a one-to-one basis and directed for defining an amount of virtual resource allocate to each of the one or more service systems, wherein each service system comprises one or more nodes for processing one or more requests,
the hub device for receiving from each service management device, an amount of excessive/lacking resource indicating a lacking amount or an excessive amount of virtual resource allocated to each service system corresponding to each service management device, and notifying each service management device of a new amount of virtual resource to be allocated to the service system corresponding to the service management device, and the one or more resource management devices for calculating the new amount of allocated virtual resource to be allocated to each service system that eliminates the amount of excessive/lacking resource, wherein each service management device:
holds a service model expressing an ordered sequence of processing of one or more nodes in the service system that corresponds to the service management device, and input and output of each node in the ordered sequence,
measures the amount of virtual resource allocated to each node of the service system, an amount of virtual resource consumed by each node in the service system, and an average processing time for each node in the service system, and records in a log each request received by the nodes in the service system,
generates a resource model expressing an amount of unused resource and an amount of used resource of each node of the service system upon input into the node based on the measured amount of virtual resource allocated to each node, the measured amount of virtual resource consumed by each node, and the measured average processing time of each node in the service system, and generates a hybrid model that is a combination of the service model and the resource model, and
simulates a resource consumption situation of each node in the service system by use of the hybrid model and the log, calculates a minimum amount of remaining resource per node as a minimum value of the measured amount of virtual resource consumed per node, and a maximum amount of lacking resource per node as a maximum value of the measured amount of virtual resource consumed per node, calculates the amount of excessive/lacking resource for the service system based on the minimum amount of remaining resource and the maximum amount of lacking resource per node, and notifies the amount of excessive/lacking resource to the hub device, the hub device:
holds the amount of excessive/lacking resource notified from each of the one or more service management device,
calculates a total amount of excessive/lacking resource indicating the total lacking amount or the total excessive amount of the amount of virtual resource allocated across all of the one or more service systems based on the total amount of excessive/lacking resource notified from each service management device the calculating of the total amount of excessive/lacking resource being done at a certain periodicity, and notifies the total amount of excessive/lacking resource to the one or mole resource management devices, each resource management device:
holds the total amount of excessive/lacking resource notified from the hub device, and confirms the total amount of excessive/lacking resource at the certain periodicity, calculates the new total amount of virtual resource to be allocated across all of the one or more service systems such that the total amount of excessive/ lacking resource is eliminated, and notifies the new total amount to the hub device to be distributed among the service systems, the hub device:

receives a notification of a new total amount of virtual resource to be allocated among the one or more service systems from the resource management device, calculates the amount of virtual resource to be allocated to each service system from the new total amount of virtual resource to be allocated across all of the service systems, such that the lacking amount or the excessive amount indicated by the amount of excessive/lacking resource in the notification sent by each service management device is eliminated, and notifies the new amount to each service management device, and each service management device:

receives a notification of the new amount of virtual resource to be allocated to the service system corresponding to the service management device, causes the new amount of virtual resource to be allocated among the one or more nodes of the service system; and updates the amount of virtual resource allocated to each node in the service system based on the new amount of virtual resource allocated among the one or more nodes.

6. A non-transitory computer readable recording medium storing one or more computer programs, which when executed by a computer system, cause the computer system to perform a method using a hub device connected to one or more service management devices, and one or more resource management devices, the one or more resource management devices connected to one or more virtual resources of different types, the one or more service management devices corresponding to one or more service systems for providing services to the one or more service systems on a one-to-one basis and directed for defining an amount of virtual resource allocated to each of the one or more service systems, wherein each service system comprises one or more nodes for processing one or more requests, the hub device for receiving from each service management device, an amount of excessive/lacking resource indicating a lacking amount or an excessive amount of virtual resource allocated to each service system corresponding to each service management device, and notifying each service management device of a new amount of virtual resource to be allocated to the service system corresponding to the service management device, and the one or more resource management devices for calculating the new amount of allocated virtual resource to be allocated to each service system that eliminates the amount of excessive/lacking resource, wherein each service management device:

holds a service model expressing an ordered sequence of processing of one or more nodes in the service system that corresponds to the service management device, and input and output of each node in the ordered sequence, measures the amount of virtual resource allocated to each node of the service system, an amount of virtual resource consumed by each node in the service system, and an average processing time for each node in the service system, and records in a log each request received by the nodes in the service system, generates a resource model expressing an amount of unused resource and an amount of used resource of each node of the service system upon input into the node based on the measured amount of virtual resource allocated to each node, the measured amount of virtual resource consumed by each node, and the measured average processing time of each node in the service system, and generates a hybrid model that is a combination of the service model and the resource model, and simulates a resource consumption situation of each node in the service system by use of the hybrid model and the log, calculates a minimum amount of remaining resource per node as a minimum value of the measured amount of virtual resource consumed per node, and a maximum amount of lacking resource per node as a maximum value of the measured amount of virtual resource consumed per node, calculates the amount of excessive/lacking resource for the service system based on the minimum amount of remaining resource and the maximum amount of lacking resource per node, and notifies the amount of excessive/lacking resource to the hub device, the hub device:

holds the amount of excessive/lacking resource notified from each of the one or more service management devices, calculates a total amount of excessive/lacking resource indicating the total lacking amount or the total excessive amount of the amount of virtual resource allocated across all of the one or more service systems based on the total amount of excessive/lacking resource notified from each service management device the calculating of the total amount of excessive/lacking resource being done at a certain periodicity, and notifies the total amount of excessive/lacking resource to the one or more resource management devices, each resource management device:

holds the total amount of excessive/lacking resource notified from the hub device, and confirms the total amount of excessive/lacking resource at the certain periodicity, calculates the new total amount of virtual resource to be allocated across all of the one or more service systems such that the total amount of excessive/lacking resource is eliminated, and notifies the new total amount to the hub device to be distributed among the service systems, the hub device:

receives a notification of a new total amount of virtual resource to be allocated among the one or more service systems from the resource management device, calculates the amount of virtual resource to be allocated to each service system from the new total amount of virtual resource to be allocated across all of the service systems, such that the lacking amount or the excessive amount indicated by the amount of excessive/lacking resource in the notification sent by each service management device is eliminated, and notifies the new amount to each service management device, and each service management device:

receives a notification of the new amount of virtual resource to be allocated to the service system corresponding to the service management device, causes the new amount of virtual resource to be allocated among the one or more nodes of the service system; and updates the amount of virtual resource allocated to each node in the service system based on the new amount of virtual resource allocated among the one or more nodes.

* * * * *